(12) United States Patent
Tzamaloukas

(10) Patent No.: US 6,862,500 B2
(45) Date of Patent: Mar. 1, 2005

(54) METHODS FOR COMMUNICATING BETWEEN ELEMENTS IN A HIERARCHICAL FLOATING CAR DATA NETWORK

(75) Inventor: Assimakis Tzamaloukas, San Jose, CA (US)

(73) Assignee: CircumNav Networks, Inc., Palo Alto, CA (US)

( * ) Notice: Subject to any disclaimer, the term of this patent is extended or adjusted under 35 U.S.C. 154(b) by 0 days.

(21) Appl. No.: 10/436,926

(22) Filed: May 12, 2003

(65) Prior Publication Data

US 2004/0230345 A1 Nov. 18, 2004

(51) Int. Cl.[7] .......................... G06F 17/00; G01C 21/26
(52) U.S. Cl. .......................... 701/1; 701/200; 340/991; 340/995.12; 455/414.2
(58) Field of Search .......................... 701/1, 117, 118, 701/200, 213; 709/217, 223, 227; 455/414.2, 70, 73; 342/357.1; 340/991, 995.12

(56) References Cited

U.S. PATENT DOCUMENTS

| | | |
|---|---|---|
| 4,350,970 A | 9/1982 | von Tomkewitsch |
| 5,610,821 A | 3/1997 | Gazis et al. |
| 5,732,383 A | 3/1998 | Foladare et al. |
| 5,953,722 A | 9/1999 | Lampert et al. |
| 6,101,443 A | 8/2000 | Kato et al. |
| 6,131,067 A | 10/2000 | Girerd et al. |
| 6,175,874 B1 * | 1/2001 | Imai et al. .................. 709/238 |
| 6,208,290 B1 | 3/2001 | Krasner |
| 6,236,933 B1 | 5/2001 | Lang |
| 6,252,544 B1 | 6/2001 | Hoffberg |
| 6,292,745 B1 | 9/2001 | Robare et al. |
| 6,393,149 B2 | 5/2002 | Friederich et al. |
| 6,429,812 B1 * | 8/2002 | Hoffberg .................. 342/357.1 |
| 6,460,046 B1 | 10/2002 | Meek |

OTHER PUBLICATIONS

Garmin StreetPilot III product description sheet. Printed from http://www.Garmin.com/products/spill/ date unkown.

* cited by examiner

*Primary Examiner*—Tan Q. Nguyen

(57) ABSTRACT

Participating vehicles and egress points communicate with each other according to an infrastructure mode. Participating vehicles communicate with other participating vehicles according to an ad-hoc mode. In an infrastructure mode packet transmitting method for a participating vehicle, beacon service table packets, vehicle service table packets, or packet bursts are created and transmitted. In an infrastructure mode packet receiving method for a participating vehicle, beacon service table packets, vehicle service table packets, packet bursts, or negative acknowledgement packets are received. In an infrastructure mode packet transmitting method for an egress point, an enhanced beacon packet or a negative acknowledgement packet is created and transmitted. In an infrastructure mode packet receiving method for an egress point, beacon service table packets, vehicle service table packets, or packets bursts are received. In an ad-hoc mode packet transmitting method for a participating vehicle, beacon service table packets, vehicle service table packets, packet bursts, or positive acknowledgement packets are created and transmitted. In an ad-hoc mode packet receiving method for a participating vehicle, beacon service table packets, vehicle service table packets, packet bursts, or positive acknowledgement packets are received.

7 Claims, 23 Drawing Sheets

Egress Point Beacon

METHODS FOR COMMUNICATING BETWEEN ELEMENTS IN A HIERARCHICAL FLOATING CAR DATA NETWORK

This application is related to U.S. patent application Ser. No. 10/272,039 filed Oct. 15, 2002 by Assimakis Tzamaloukas, et al., and entitled "Enhanced mobile communication device, and transportation application thereof," the entirety of which is hereby incorporated by reference.

BACKGROUND

Global Positioning Systems (GPS); or GPS receivers, are being used in increasing numbers in automobiles to provide vehicle navigation functions. Typically, a GPS receiver or navigation device comprises a digital road map, or geographic information (GIS) database, of the area of travel. A user, such as the driver of a vehicle, inputs a destination into the GPS navigation device and the GPS navigation device calculates a route from the current position of vehicle, through the network of roads as represented in the GIS database, to the destination. Turn-by-turn directions are relayed to the driver through visual or audible prompts. The current position of the vehicle is determined by receiving GPS signals from GPS satellites. If the GPS signals are obstructed or interfered with, the current position of the vehicle may be very difficult to ascertain and the usefulness of the GPS navigation device is severely degraded. GPS signals may be obstructed, for example in urban areas with many tall buildings, on roads with many trees or mountains, and in areas with high levels of background radio noise or interference.

In order to provide accurate driving direction the GIS database must be kept current and up-to-date. Databases, with varying levels of accuracy, are commercially available and are released for purchase and installation into GPS receivers at regular intervals. Oftentimes, since the databases are updated manually through visual surveys of the roadways, aerial observations, government data, and individual travel on the roadways, it takes on average six months to create a new database. Additionally, on average, by the time a user is able to obtain the database and install it the database is already obsolete by around three months. Furthermore, the database is only as good as the individual observations and therefore may be incomplete in certain areas of travel as observations have not been made of those areas.

Some attempts have been made to automate the database update process by providing a central database and a plurality of vehicles containing sensors. The vehicles travel a geographical region of interest and collect sensor information. The sensor information is processed and communicated to the central database. The central database receives the sensor information, processes it further, and integrates the sensor information into the central database. The centralized-only communication architecture of these approaches increases the cost and complexity of integrating the collected data. Furthermore, these approaches require a large number of vehicles constantly moving around the geographic region in order to cover as much area as possible, and collect as much sensor information as possible. Additionally, it is very difficult to collect consistent sensor measurements since different traffic conditions, drivers, traffic lights, weather, and the like will result in different sensor measurements and thus different information pertaining to a particular route. Also, this centralized only approach relies on wireless communications directly to the central database. In many cases, due to geographical considerations for example, it may not be possible to communicate at all with the central database.

It would be advantageous to have systems and methods that communicate map databases and route information between vehicles traveling a transportation network, and between vehicles and a central database without the limitations of the prior art. It would be further advantageous to have systems and methods that determine the geographic location of vehicles unable to receive GPS signals. Thus a need presently exits for methods for communicating between element in a hierarchical floating car data network.

SUMMARY

By way of introduction, the preferred embodiments below provide methods for communicating between elements in a hierarchical floating car data network. Participating vehicles and egress points communicate with each other according to an infrastructure mode. Participating vehicles communicate with other participating vehicles according to an ad-hoc mode. In an infrastructure mode packet transmitting method for a participating vehicle, beacon service table packets, vehicle service table packets, or packet bursts are created and transmitted. In an infrastructure mode packet receiving method for a participating vehicle, beacon service table packets, vehicle service table packets, packet bursts, or negative acknowledgement packets are received. In an infrastructure mode packet transmitting method for an egress point, an enhanced beacon packet or a negative acknowledgement packet is created and transmitted. In an infrastructure mode packet receiving method for an egress point, beacon service table packets, vehicle service table packets, or packets bursts are received. In an ad-hoc mode packet transmitting method for a participating vehicle, beacon service table packets, vehicle service table packets, packet bursts, or positive acknowledgement packets are created and transmitted. In an ad-hoc mode packet receiving method for a participating vehicle, beacon service table packets, vehicle service table packets, packet bursts, or positive acknowledgement packets are received.

The foregoing paragraph has been provided by way of general introduction, and it should not be used to narrow the scope of the following claims. The preferred embodiments will now be described with reference to the attached drawings.

DETAILED DESCRIPTION OF THE PRESENTLY PREFERRED EMBODIMENTS

Figure 1:
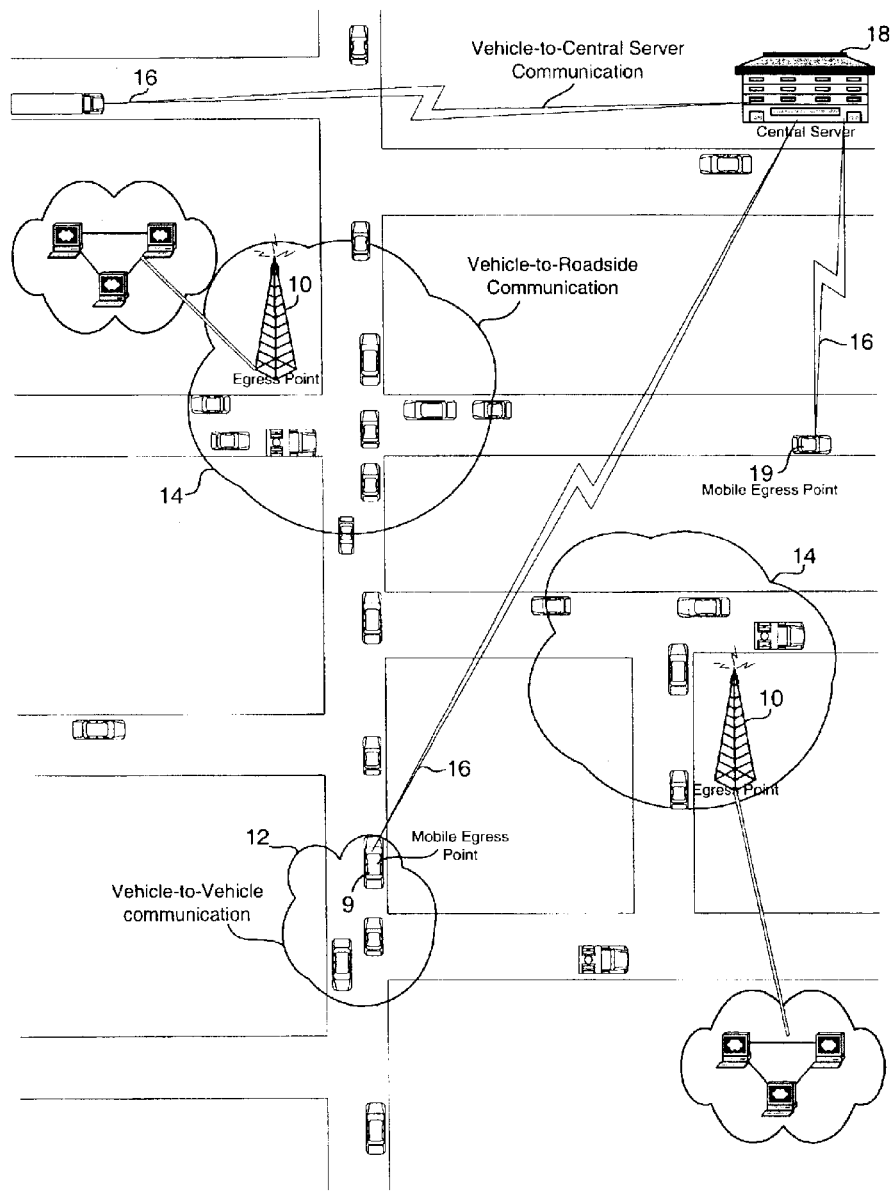
FIG. 1 is a hierarchical floating car data network.

FIG. 1 shows a hierarchical floating car data network. The hierarchical floating car data network comprises a central server 18, an egress point network 14 comprising a plurality of egress points 10, and a participating vehicle network 12 comprising a plurality of participating vehicles. At least some of the vehicles of the hierarchical floating car data network are participating vehicles. Participating vehicles are vehicles that comprise on-board equipment such as an enhanced mobile communication device. One such enhanced mobile communication is described in U.S. patent application Ser. No. 10/272,039.

Participating vehicles are operative to communicate directly 12 with other participating vehicles, to communicate 14 with the egress point network, and to optionally communicate 16 with the central server. Participating vehicles collect and exchange data, such as traffic data, as the participating vehicle traverses the roads of the transportation network. A driver of a participating vehicle is a "user" or "end user."

Egress points 10 are located throughout the transportation network. Typically, the location of the egress points 10 is fixed and their location is known. Participating vehicles may communicate with the egress point 10. The egress points 10 may further be connected to the Internet or other wireline network. Participating vehicles may communicate with the egress points 10 according an IEEE 802.11 infrastructure mode of communications. Additionally, as least some of the plurality of egress points 10 may communicate with each other.

Egress points 10 are fixed egress points, that is their location remains fixed. Some participating vehicles may communicate with the central server. Such participating vehicles are mobile egress points, for example participating vehicles 9 and 19 are mobile egress points. The functionality of mobile egress points is identical to that of fixed egress points. A mobile egress point may communicate directly with other participating vehicles, with other mobile egress points, with fixed egress points, and with the central server. The egress point network comprises fixed egress points and mobile egress points. Typically, a mobile egress point is a vehicle such as a fleet vehicle having a known schedule and trajectory.

The central server 18 receives communications, or content, from the egress point network. Content includes all types of data exchanged within the hierarchical floating car data network such as traffic data, GIS data, end user profile data, and synchronization data. The central server comprises a central geographic database, navigation applications, and network monitoring and management functions. The terms "central geographic database" and "central database" are used interchangeably herein.

Participating vehicles, egress points, and the central server communicate with each other in many ways. Participating vehicles may communicate directly with each other. Any two participating vehicles, including for example a participating vehicle and a mobile egress point, or for example two mobile egress points, that are in range of each other can communicate using an enhanced ad-hoc mode of communications as described in U.S. patent application Ser. No. 10/272,039. This mode of communications is referred to as vehicle-to-vehicle (v2v) communications. The participating vehicles exchange traffic information, navigation information, as well as geographic database information stored and maintained local to each participating vehicle.

Participating vehicles and egress points may communicate with each other. Any participating vehicle that comes within range of an egress point can communicate with that egress point according to the IEEE 802.11 infrastructure mode. A mobile egress point and fixed egress point also communicate with each other according to the infrastructure mode. A participating vehicle can transmit and receive data from an egress point. This form of communications is referred to as vehicle-to-roadside (v2r) communications 14. The egress points may also be operative to communicate with a wireline network, such as the Internet, thereby enabling the egress points to communicate with the central server and with other egress points.

In one more form of communication, referred to as vehicle-to-central server (v2c) communication, a participating vehicle, or mobile egress point, communicates directly with the central server via a wireless wide area network (WWAN) link. A WWAN link is a cellular phone link such as CDPD, GPRS, 1xRTT, or 3G. A WWAN link is also a long-range line-of-sight microwave link or a satellite link.

Figure 2:
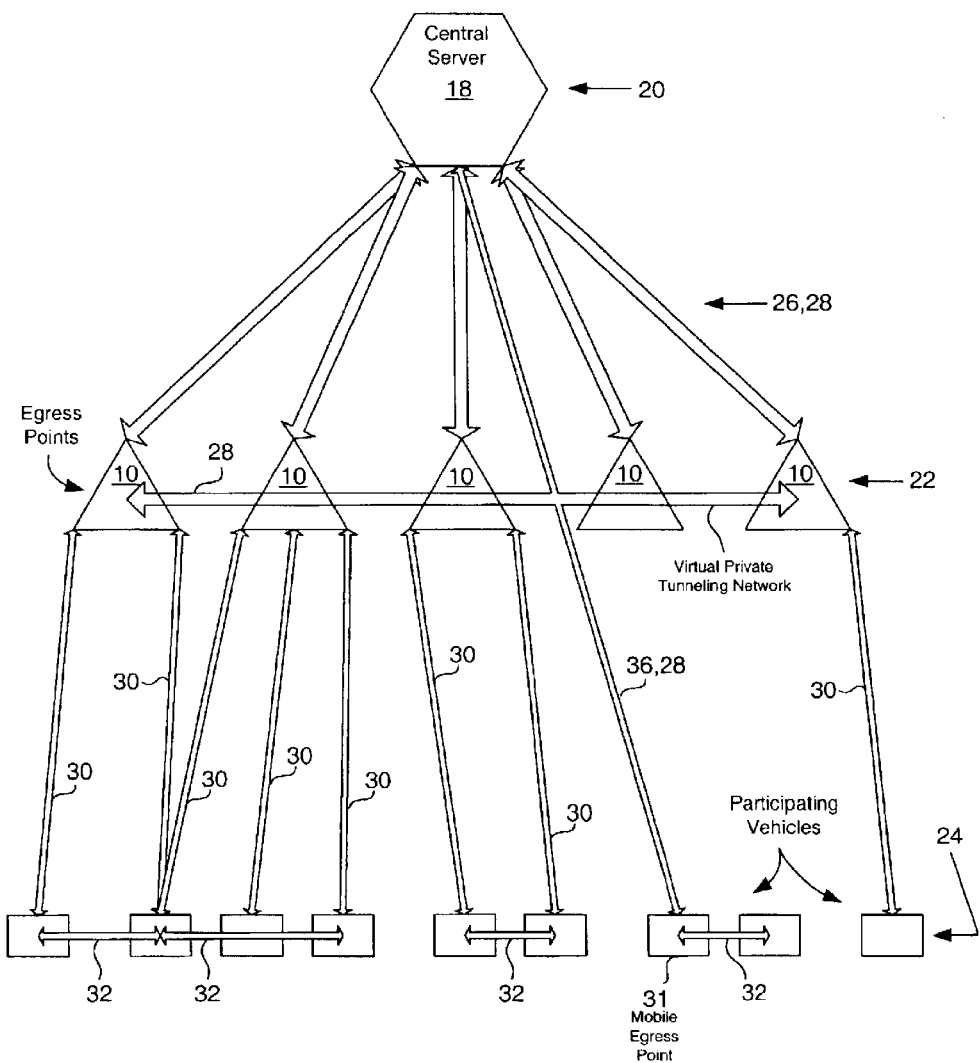
FIG. 2 shows the layers of the hierarchical floating car data network.

FIG. 2 shows the layers of the hierarchical floating car data network. The hierarchical floating car data network comprises three layers: a central server layer 20, an egress point network layer 22, and a participating vehicle network layer 24. Some participating vehicles that serve as mobile egress points, for example mobile egress point 31, are part of both the participating vehicle network layer 24 and the egress point network layer 22.

The central server layer 20 comprises a central server 18 as described above. The egress point network layer 22 comprises a plurality of egress points. The plurality of egress points may comprise fixed egress points and mobile egress points. The egress points can communicate 26 with the central server 18 through wireline or wireless communications. Additionally, at least some of the egress points, whether mobile or fixed, can communicate 28 with at least some other of the egress points, that is, an egress point has one or more peer connections with other egress points.

The participating vehicle network layer 24 comprises a plurality of participating vehicles 32. A participating vehicle may communicate 30 with egress points of the egress point network. Some of the participating vehicles may be mobile egress points and communicate 36 with the central server and other mobile and fixed egress points. The participating vehicles may communicate directly 32 with other participating vehicles.

A virtual private tunneling network (VPTN) 28 is created and used for communicating between the central server and the fixed and mobile egress points. A network tunnel is a communication mechanism to establish a direct connection between two Internet host machines just as if there was a direct physical connection. A virtual, overlay network can be formed using a plurality of tunnels with the appropriate end-host IP addresses. Typically, fixed egress points that are more closely located geographically are configured to communicate with one another. This better serves location-based applications such as traffic and map updates. Mobile egress points by default establish a tunnel with the central server. If due, to performance or scalability issues, it is necessary or advantageous to communicate with a fixed egress point, a list of fixed egress points is traversed based on the proximity to the mobile egress point's current location.

The central server 18 of the central server layer 20 comprises the central geographic database and receives content from the egress points 10 and the participating vehicles 24. The central database processes the content to update and keep current the central database. Updates may be performed on the database at various times. For example, the database may be updated during off-peak hours when the number of communication links from participating vehicles is low, the database can be updated every hour, or updated every minute, or the database can be updated when each new piece of traffic update information is received from the participating vehicles. After the database is updated, the database is checked for integrity and stability before replacing the database in use. Shadow databases, as well as other methods known by those of ordinary skill in the art, may be used to ensure the uninterrupted availability of the central server geographic database.

All or portions of the central database may be communicated to the egress points and the participating vehicles. For example, a participating vehicle may request routing information. The central server processes this request and communicates information to the participating vehicle based on, for example, the speed and direction of the participating vehicle. U.S. Pat. No. 6,292,745, which is hereby incorporated by reference, shows a method and system for forming a geographic database and communicating information to end users.

Figure 3:
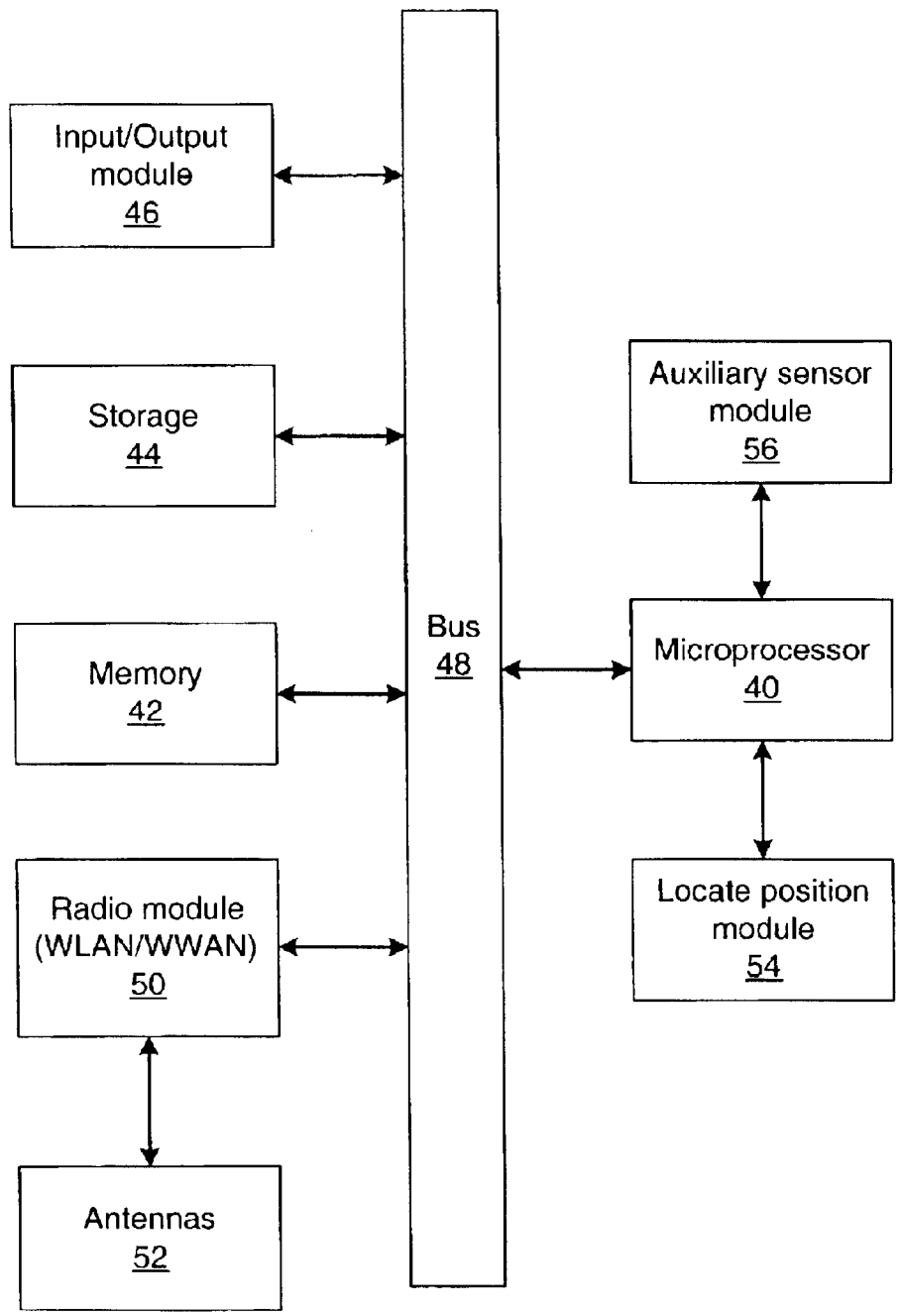
FIG. 3 shows the hardware components of on-board equipment of a participating vehicle in the hierarchical floating car data network.

FIG. 3 shows the hardware components of the on-board equipment of a participating vehicle. The on-board equipment comprises a locate position module 54, an input/output module 46, a memory 42, a microprocessor (CPU) 40, a storage device 44, a radio module 50 comprising a Wi-Fi/Cellular radio, antennas 52, a bus 48, and optionally auxiliary sensors 56. The bus interconnects the components of the on-board equipment. Additionally, some of the components may have direct connections with each other and with the CPU 40.

The CPU 40 is a microprocessor such as an embedded processor capable of supporting a flat 32-bit address space. Many such processors are available from companies such as ARM, Motorola, and Intel. The memory 42 comprises memory such as dynamic random access memory (DRAM), non-volatile memory, static random access memory (SRAM), and the like. The memory stores processed and unprocessed data such as sensor data from the locate position module 54, as well as data received by the radio 50. The storage 44 comprises a permanent storage device or medium such as CD, DVD, compact flash memory, a hard disk drive, and the like. The storage 44 performs a similar function as the memory, but typically has a much higher capacity and is non-volatile. In some embodiments, there may be a memory but no storage, or very little memory and a large amount of storage.

The input/output module 46 comprises various devices to permit a user to input information into the on-board equipment, and receive information from the on-board equipment. For example, the input/output module 46 may comprise keypads, voice recognition devices, buttons, or a touch screen so that the user can enter information such as a destination or a point of interest. A visual display such as an LCD screen as well as devices to produce voice commands or other audible alerts may be part of the input/output module 46. The input/output module 46 may also include an infrared port, a Bluetooth port, a Wi-Fi port, a cellular radio, a serial data port, a USB port, or a parallel data port thereby allowing the user to upload and download information to and from the on-board equipment.

The bus 48 comprises data and control paths between the hardware components input/output module 46, memory module 42, CPU 40, storage device 44, and Wi-Fi/cellular radio 50. The locate position module 54 and the auxiliary sensors 56 are connected directly to the CPU 40. The antennas 52 are connected to the radio module 50. Various different busses may be implemented such as a PCI bus.

The radio module (Wi-Fi/cellular radio) 50 comprises a wireless local area network (WLAN) radio such as an IEEE 802.11 (Wi-Fi) radio, and further optionally comprises a wireless wide area network (WWAN) radio such as a digital cellular phone using global packet radio service (GPRS), 3G, microwave, satellite, or other long-range wireless implementation. The Wi-Fi radio 50 is used for vehicle-to-vehicle communication as well as for vehicle-to-roadside communications. For vehicle-to-vehicle communications the radio operates using the enhanced ad-hoc mode of communications of U.S. patent application Ser. No. 10/272,039.

The optional WWAN radio may be present in a small percentage of participating vehicles for vehicle-to-central server communications. Vehicle-to-central server communications may take place under a variety of circumstances. For example, data collected by the on-board equipment may be very large in quantity and could create storage capacity issues for the on-board equipment. If the on-board equipment is unable to communicate the data to other participating vehicles or to an egress point, it may communicate the data to the central server. Also, if the on-board equipment needs to request data but is not within range of any other participating vehicles or an egress point, it may communicate with the WWAN radio.

The antenna module 52 comprises the antennas used by the on-board equipment for wireless communications. For example the antenna module 52 may comprise an external antenna with high gain for the Wi-Fi radio 50. A pair of dipole antennas may be used to exploit spatial and antenna diversity. Two 30-degree directional antennas, one pointing forward towards the direction of the traffic flow and the other pointing backwards behind a participating vehicle, provides optimized communication coverage for a participating vehicle. The location of the external Wi-Fi antenna also directly affects performance. In general, installing the external antenna on the roof of the participating vehicle improves performance since wave propagation is unobstructed due to the height and visibility of the antenna. A location near any of the windows also improves performance since signal attenuation is small, around 2 dBi to 3 dBi, even though the multipath effect is much higher due to the reflection of the wave from the metal components of the participating vehicle. Other antennas include an integrated antenna that is part of off-the-shelf Wi-Fi PCI, PCMCIA, or SD cards. Another antenna is a GPS receiver antenna. Generally, GPS receiver antennas should have a clear view of the sky. With a clear view of the sky, a GPS receiver antenna can track many satellites and accurately calculate the current location of the vehicle. Cellular phone and satellite antennas may also be used.

The locate position module 54 allows the on-board equipment of the participating vehicle to ascertain its geodetic coordinates. The locate position module 54 may comprise sensors such as a GPS receiver. Many types of GPS receivers may be used such as a differential GPS (DGPS) receiver, or an assisted GPS (A-GPS) receiver. Companies such as Ashtech, Garmin, Trimble, and SiRF provide GPS receivers. Additionally, when available, a wide area augmentation system (WAAS) such as that used by the coastguard, or a local area augmentation system (LAAS) such as that used by airports can provide improved location accuracy. The optional auxiliary sensors 56 may include a speed sensor, a barometer, a gyroscope, a bearing sensor, an inertial sensor, and the like.

Figure 4:
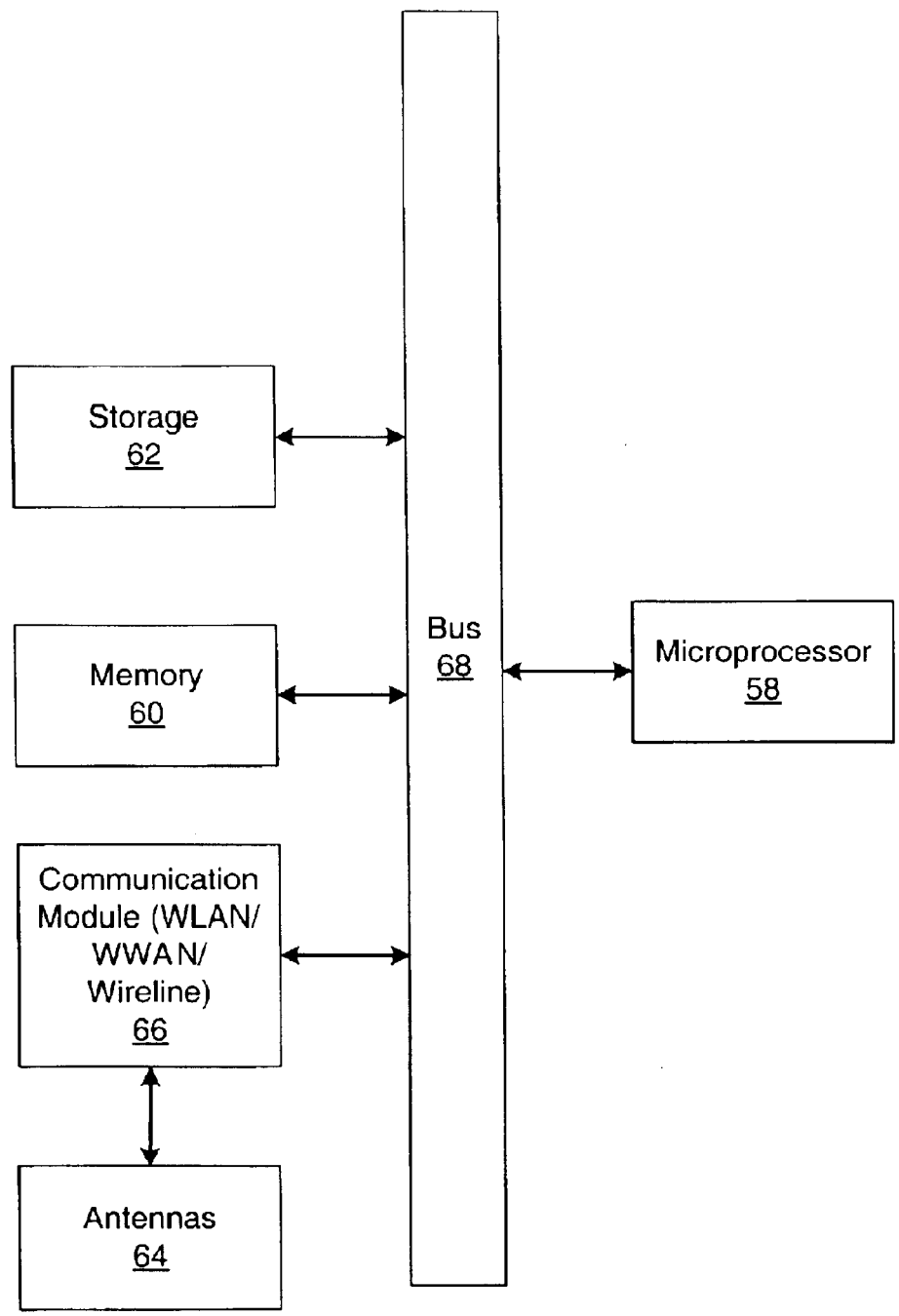
FIG. 4 shows the hardware components of an egress point of the hierarchical floating car data network.

The egress points 10 of the egress point network comprise egress point equipment as shown in FIG. 4. The egress point equipment comprises a memory 60, a microprocessor (CPU) 58, a storage device 62, a bus 68, antennas 64, and a communication module 66 comprising a wireless local area network radio such as a Wi-Fi radio, a wireless wide area network radio such as a cellular radio, and a wireline connection. The components are very similar to those discussed above in accordance with the on-board equipment. The memory 60, microprocessor 58, storage device 66, and communication module 66 are in communication via the bus 68. The antennas 64 are connected to the communication module 66. Generally, the memory 50, CPU 58, and storage device 62 have a higher capacity than that of the on-board equipment since the egress point equipment must be able to communicate with and process communications from a plurality of participating vehicles. The antenna module 64 comprises, for example, a pair of directional high gain Wi-Fi antennas pointing in the opposing directions of traffic flow. An array of two or more directional antennas may be used for improved wireless range coverage. The communication module 66 comprises the wireless radios as described above and also comprises a wireline connection. Examples of a wireline connection are a digital subscriber line (DSL), a cable modem, a T1 line, a T3 line, and an optical line. The wireline connection connect the egress point equipment with the Internet.

Determining the Position of a Vehicle

As stated above, the locate position module 54 of the on-board equipment provides the location of the participating vehicle through GPS signals. In many cases the GPS signal is too weak or is blocked and the on-board equipment cannot ascertain its position. For example, in cities with tall building the GPS signal may be extremely weak due to effects such as the urban canyon effect. Various dead-reckoning techniques may be used to ascertain the position of the participating vehicle in the absence of a complete GPS signal. For example an adjacent position dead-reckoning method uses a gyroscope or compass in order to estimate the vehicle's position based on its current velocity and direction. Many dead reckoning methods use estimation methods such as least minimum square error (LMSE), autoregressive equations and Kalman filtering. Dead-reckoning methods that rely on the vehicle's projected velocity can provide false or inaccurate position measurements. For example, if a vehicle stops at a traffic light for several seconds a large error is likely to appear in the case when the average velocity is used to perform a position calculation.

Figure 5:
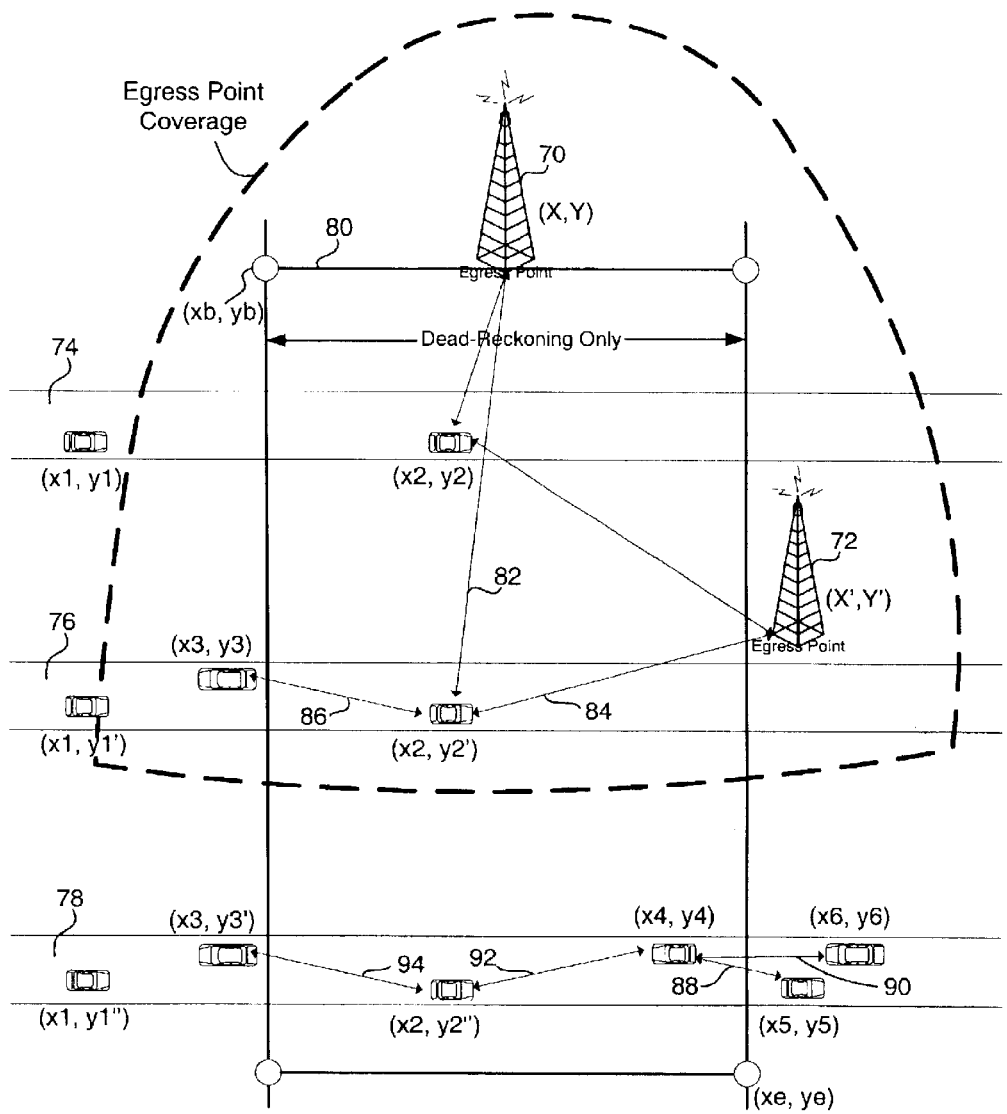
FIG. 5 shows an enhanced dead reckoning method.

An enhanced dead-reckoning method for determining the position of a participating vehicle is shown in FIG. 5. Participating vehicles travel along three parallel roads 74, 76, and 78. A first egress point 70 is located at position (X,Y) and a second egress point 72 is located at position (X',Y'). The locations of the egress points are static and are known by the participating vehicles, or are communicated to the participating vehicles periodically with geo-beacon packets.

In the example of FIG. 5, participating vehicles are unable to receive GPS signals when the participating vehicles are within the area defined by the rectangle 80 from (xb,yb) to (xe,ye). The vehicle at location (x1,y1) is not within rectangle 80 and receives a location reading from the GPS signals. The vehicle at location (x2,y2) does not receive a GPS signal and therefore uses enhanced dead-reckoning. The vehicle at location (x2,y2) is within range of the egress points 70 and 72 located at (X,Y) and (X',Y') respectively, and receives egress point location information from geo-beacons as mentioned above.

A participating vehicle, such as vehicle at location (x2, y2), uses prior art dead-reckoning methods and link quality information from egress points 70 and 72 to roughly estimate its location. Signal-to-noise (SNR) ratio is used to describe the difference between the signal strength versus the noise level at a location. When a vehicle receives a packet from an egress point it derives the SNR ratio for that packet at that location. In general, the higher the SNR ratio the closer the vehicle is located to an egress point with a fixed, known location.

The accuracy of the location calculation can be further enhanced by way of a received signal strength indication (RSSI) communicated from the Wi-Fi radio 50 of the on-board equipment and the Wi-Fi radio 66 of the egress point equipment. For example, the participating vehicle can create a query packet that comprises the RSSI and request that the egress points calculate its position using calculations and terrain calibration data. Terrain calibration data is generated when the egress points are installed through field measurements and post-processing simulation using wave propagation tools. Wave propagation tools are available from Ekahau Inc., Silicon Valley Wireless Inc., and others.

Observed time difference (OTD) methods can also be used to calculate the location of the vehicle. For example, in observed time difference of arrival (OTDOA) synchronous transmission from all egress points within range may be used and a difference calculation may be performed at the participating vehicle. In another example, the participating vehicle transmits time stamped packets to the egress points, and the egress points calculate the position of the participating vehicle using the time stamped packets. Generally, the more egress points that are within range of the participating vehicle, the greater the accuracy of the position calculation of the participating vehicle. However, even with one egress point within range, a position calculation can be performed either at the participating vehicle or at the egress point. The location error will be higher however than if multiple egress points were in range. OTD, OTDOA, SNR and RSSI methods may be used in combination.

Referring back to FIG. 5, vehicle (x2,y2') on road 76 can communicate 82, 84 with egress point 70 and egress point 72 to compute its location. The accuracy of the location can be further enhanced with a vehicle-to-vehicle link 86 with the vehicle at location (x3,y3). Vehicle (x3,y3) is able to receive GPS signals. The vehicle-to-vehicle link 86 is at most several hundred feet so the location of vehicle (x2,y2') is at most several hundred feet from the location of (x3,y3). The accuracy of the location of vehicle (x2,y2') may be further enhanced by applying enhanced dead-reckoning methods based on OTD, OTDOA, SNR or RSSI between the vehicle at location (x3, y3) and egress points within range.

The vehicle at location (x2,y2") is not within range of any egress points and cannot receive GPS signals. However, vehicle (x2,y2") is within range of vehicle (x3,y3') and receives a GPS measurement from that vehicle over vehicle-to-vehicle link 94. Additionally, vehicle (x2,y2") can communicate with vehicle-to-vehicle link 92 with vehicle (x4, y4). While vehicle (x4,y4) cannot receive GPS signals, it can communicate with vehicle (x6,y6) and vehicle (x5,y5) using vehicle-to-vehicle links 90 and 88 respectively. Vehicles (x6,y6) and (x5,y5) can receive GPS signals and the locations of those vehicles can be transmitted to vehicle (x2,y2") by way of vehicle (x4,y4). Furthermore, vehicle (x2,y2") can receive the location of vehicle (x4,y4) as ascertained through dead-reckoning. Vehicle (x4,y4) having just entered rectangle 80 has been using enhanced dead-reckoning for only a short time an thus has a more accurate location measurement.

Assisted GPS (A-GPS) can also be used to provide a location for a vehicle unable to receive GPS signals or able to receive only intermittent GPS signals, such as in U.S. Pat. Nos. 6,131,067 and 6,208,290, both of which are hereby incorporated by reference.

In the context of the hierarchical floating car data network A-GPS is adapted so that a participating vehicle broadcasts a location request packet comprising its approximate current position as derived from dead-reckoning. An egress point within range receives the location request packet and responds with another packet comprising the satellites in view for the participating vehicle, Doppler frequency corrections, and other information to enable the on-board equipment to calculate the current location of the vehicle. This method is used in vehicle-to-vehicle communications, such as the example given above for vehicle (x2,y2"), wherein one vehicle is unable to receive GPS signals and at least one other vehicle within range is able to receive GPS signals.

A minimum of four satellites must be in view of a participating vehicle to identify all three coordinates with a GPS receiver. If only three satellites are within view, a participating vehicle can still accurately derive latitude and longitude, but cannot accurately derive altitude.

Egress Point Equipment and On-board Equipment

Figure 6:
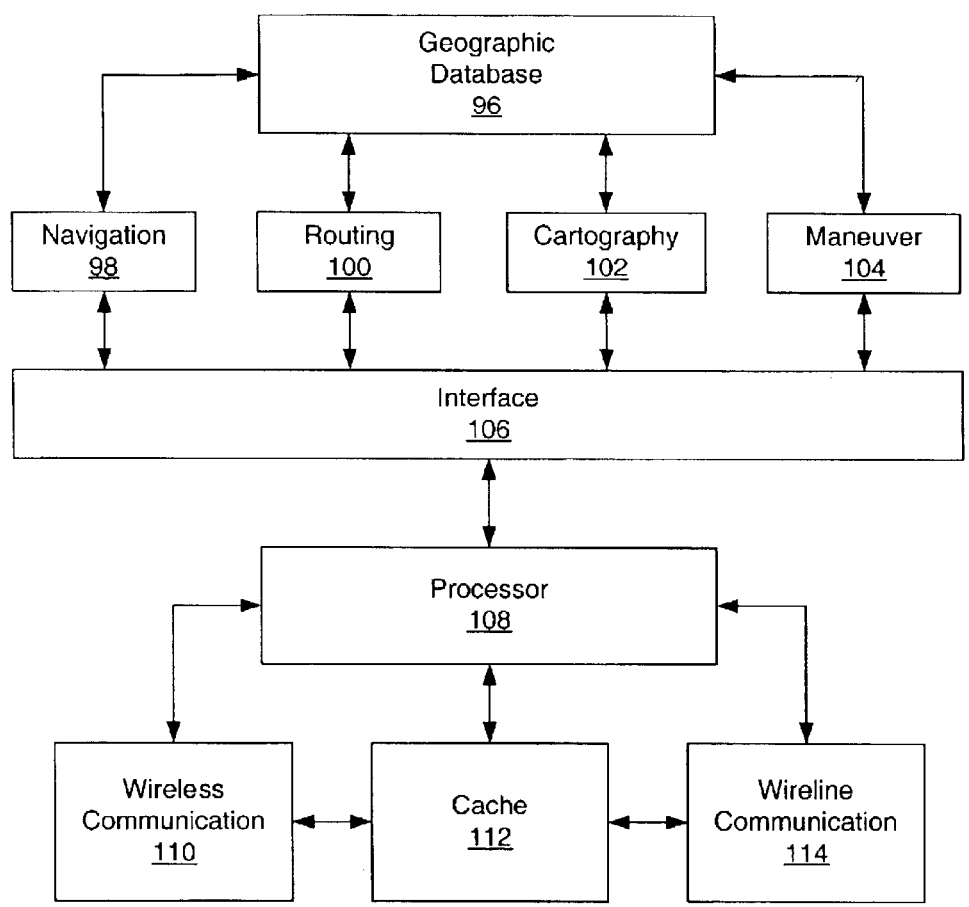
FIG. 6 illustrates the components of egress point software of an egress point.
Figure 8:
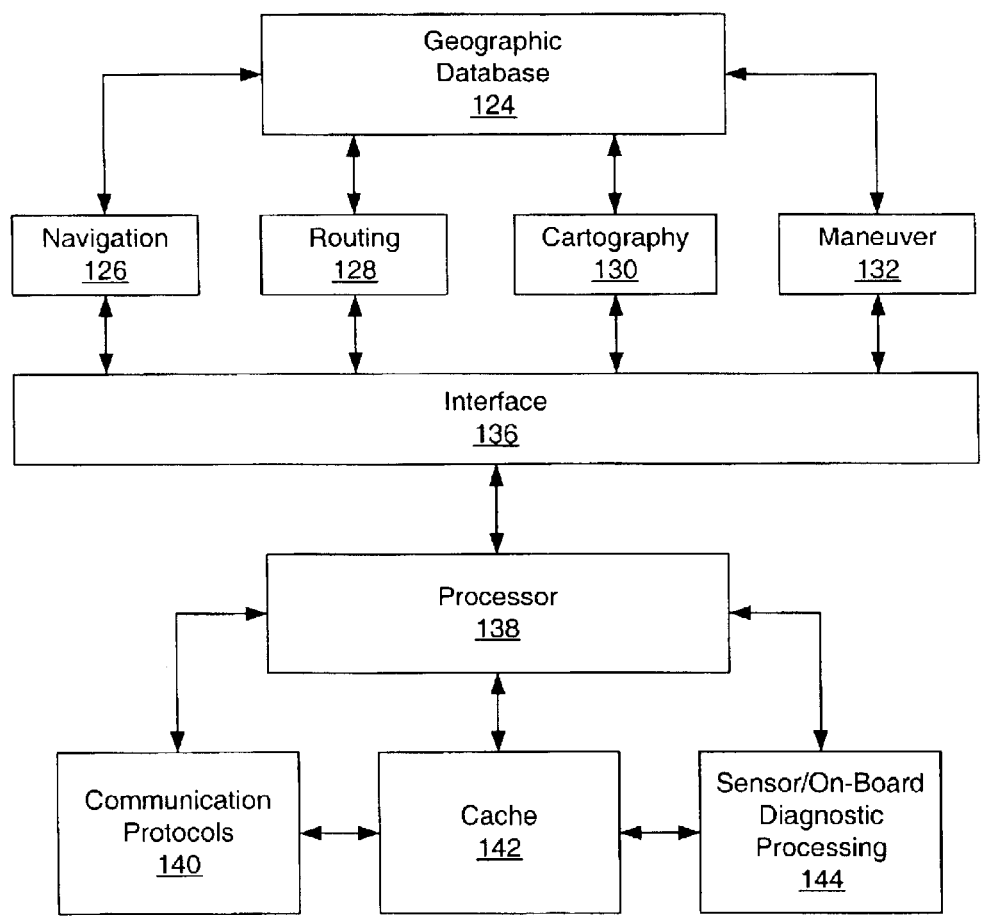
FIG. 8 illustrates the components of on-board software of the on-board equipment.

FIG. 6 illustrates the components of egress point software executed by the egress point equipment of FIG. 4. FIG. 8 illustrates the components of on-board software executed by the on-board equipment of FIG. 3. Many of the components of the egress point software and the on-board software are similar. The egress point software comprises a geographic database 96, a navigation module 98, a routing module 100, a cartography module 102, a maneuver module 104, an interface module 100, a processor module 108, a wireless communication module 110, a cache 112, and a wireline communication module 114. Briefly, the egress point software accumulates, processes, and propagates data from participating vehicles in range.

The egress point communicates the accumulated and processed data with the central server. This occurs periodically, for example every hour. In another example, the egress point uploads data to the central server when more than one half of its storage capacity is used. The egress point supports remote management and control functions that allow a remote user to retrieve data stored at the egress point.

The egress point maintains a list of other egress points that can be communicated with for intra-egress communications as described above (28 of FIG. 2). For example, egress points in close proximity to one another may be able to communicate with each other. Egress points delete data that they have accumulated when, for example, the data has been communicated to the central server, or when the data has been communicated to another egress point. Accumulated data is deleted after an explicit positive acknowledgement is received that identifies the successful transfer of custody of the data within the hierarchical floating car-data network. Mobile egress points may use a more conservative or dynamic on-demand communication schedule to reduce the cost of airtime through the WWAN link.

Figure 7:
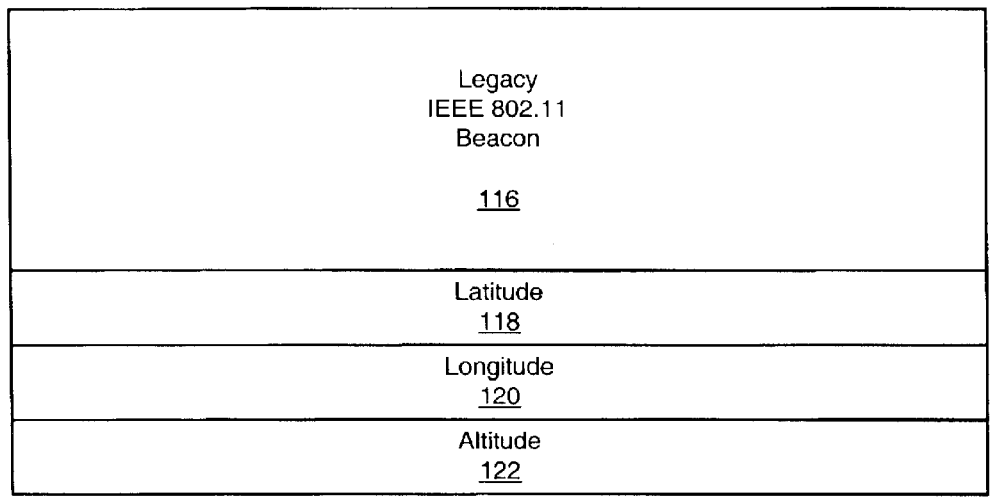
FIG. 7 shows an enhanced beacon format used by an egress point.
Figure 7:

The wireless communication module 10 comprises a modified IEEE 802.11 device driver that creates an enhanced beacon format as shown in FIG. 7. The enhanced beacon format comprises a legacy IEEE 802.11 beacon 116, a latitude field 118, a longitude field 120, and an altitude field 122. The dimensions of latitude, longitude, and altitude are expressed in navigation dimensional units equal to $\frac{1}{100,000}$ of a degree. The navigation units may be absolute or relevant to a coordinate position on the surface of the earth. The navigation units may be integers where the smallest unit of measurement is 1, which represents $\frac{1}{100,000}$ of a degree. Any compact binary encoding method may be used to represent the navigation unit values. Alternatively, floating point coordinates can be sent as part of the enhanced beacon. Floating point coordinates will reduce the location error to less than one meter. Egress points may transmit legacy beacon packets only, enhanced beacon packets only, or combinations of the two. Egress points may interleave legacy and enhanced beacons to reduce network overhead and to maintain ubiquitous compatibility across egress points and legacy IEEE 802.11 devices.

The egress points are configured to operate on a frequency channel specified by the central server, which maintains a channel frequency allocation map. If wave propagation conditions indicate that there is a need to change to a different channel then the egress point requests a new channel from the central server. The channel frequency allocation map is used throughout the hierarchical floating car data network and the egress points are not regularly reconfigured to switch channels, rather they request channel reallocation from the central server. Additionally, before an egress point switches channels it broadcasts that switch to the participating vehicles within range. Every egress point in the hierarchical floating car data network receives updates comprising a new frequency allocation map when the frequency allocation changes. The frequency allocation map may also be transmitted at regular intervals. Participating vehicles are assigned the same frequency channel as the egress point with which they are in range of. In this way, a participating vehicle will seamlessly receive beacons from an egress points as it comes within range. If an egress point has changed its frequency channel, participating vehicles that have received notice of the change in frequency channel communicate this information to other participating vehicle via the vehicle-to-vehicle network.

The egress points broadcasts beacons every 100 ms. Alternatively the egress points may vary the time frequency at which they broadcast beacons from 100 ms to 1000 ms.

This may occur, for example, if an egress point is within range of a large number of slow moving vehicles. If small numbers of fast moving vehicles are within range, the beacon frequency may be set from 10 ms to 100 ms. Statistics concerning the performance of the egress point network are maintained in order to determine the optimal beacon frequency transmission rate.

FIG. 8 illustrates the components of on-board software executed by the on-board equipment of FIG. 3. The on-board software comprises a geographic database 124, a navigation module 126, a routing module 128, a cartography module 130, a maneuver module 132, an interface module 136, a processor module 138, a communication protocol module 140, a cache module 142, and a sensor/on-board diagnostics (OBD) processing module 144. As mentioned above, many of the modules of the on-board software of FIG. 8 and the egress point software of FIG. 6 are the same. For example modules 124, 126, 128, 130, 132, 136, 138, and 142 of the on-board software provide identical functions to modules 96, 98, 100, 102, 104, 106, 108, and 112 respectively of the egress point software.

The processor module 138 comprises an embedded operating system, device drivers, application programming interfaces (APIs), and a user space application. The embedded operating system is embedded Linux, with open source drivers and APIs for the hardware components described in accordance with FIG. 3 (and FIG. 4 for the egress point equipment). Other operating systems may be used. The user space application monitors the status of the software modules and executed a finite state machine such as the finite state machines of U.S. patent application Ser. No. 10/272,039.

The processor module 138 communicates with the interface module 136, the cache module 142, the sensor/OBD processing module 144, and the communication protocols module 140. The cache module 142 is in communication with the sensor/OBD processing module 144, and the communication protocols module 140. The communication protocols module 140 comprises executable code for communicating according to the communication protocols used by the on-board equipment, for example WLAN. Multiple communications are supported, and multiple communication protocols may be simultaneously in use. For example a WLAN link may be active between a participating vehicle and another participating vehicle or egress point, and, at the same time, a WWAN link may be active for uploading or requesting information from the central server.

A WLAN communication protocol, also referred to as baseline radio, used by the on-board equipment is described in U.S. patent application Ser. No. 10/272,039. The baseline radio is expanded to include vehicle-to-vehicle and vehicle-to-roadside communications, hereinafter referred to as extended radio.

The baseline radio operates according to an enhanced IEEE 802.11 ad-hoc mode. It supports broadcast packet transmission so that participating vehicles can establish vehicle-to-vehicle communication for exchanging traffic data. The enhanced ad-hoc mode uses adaptive data rate control methods along with redundant packet retransmission methods at the link layer. The IEEE 802.11 power control, static channel assignment, and error control coding algorithms are not modified.

The extended radio supports vehicle-to-vehicle communications as above and also supports vehicle-to-roadside communications for communicating with an egress point or an IEEE 802.11 access point. To optimize the enhanced ad-hoc mode of the extended; radio the IEEE 802.11 beacon generation frequency is set to 0, that is, there are no MAC (media access controller) beacons created to synchronize radios. MAC beacons are generally used to optimize the throughput of a WLAN, but for vehicle-to-vehicle communications, where links are short-lived with low throughput, the delay overhead from beacons is expensive and redundant. Also, to further optimize the enhanced ad-hoc mode there are no authentication, association, power management, or any other control or management IEEE 802.11 packets exchanged. Additionally, channel assignment is fixed for all vehicles to avoid long delays resulting from scanning channels for beacons and other traffic activity.

Dynamic channel assignment may be used based on the location of the participating vehicle. A frequency assignment process maps individual channels to individual regions. A participating vehicle learns the current frequency allocation communicating with the central server, an egress point, or through a synchronization process that can take place between a legacy IEEE 802.11 access point and a participating vehicle located at a home-garage or an office parking lot. For example, all participating vehicles use channel 2 to establish vehicle-to-vehicle communication while in exemplary region A, and channel 5 in exemplary region B. When a participating vehicle moves from region A to region B, the participating vehicle switches from channel 2 to channel 5.

A region can support more than one frequency channel to provide additional communication capacity. If more than one channel is supported by a region, the participating vehicles can switch among the available channels. Since scanning channels in the direct sequence spread spectrum modulation mode requires time, unnecessary switching between multiple channels in a single region can degrade overall network performance. In cases where a participating vehicle is unable to establish communication with other elements of the hierarchical floating car data network a corrupted or obsolete channel frequency allocation map may result. In such a case, all 11 available channels of the 2.4 GHz ISM band are scanned. For improved performance, the scanning process may use a dwell time of less than 100 ms per channel. Once activity is identified at one or more of the channels, the scanning process can dynamically loop through only those channels with a dwell time of 250–500 ms per channel. This scanning process is supported by most commercially available 802.11 (Wi-Fi) radios. The device drivers and firmware implementations of the radios may vary. For example, the MAC controller from a Cisco Systems radio has an integrated scanner, whereas MAC controllers for an Intersil radio usually require an explicit signal to place the radio into scanning mode in order to be able to hop between different frequency channels.

The infrastructure mode of communications is used when communicating with an egress point or access point. The enhanced ad-hoc mode is for communicating between participating vehicles, that is, for spontaneously forming a local wireless network. A method is required for switching between the enhanced ad-hoc mode of communication and the infrastructure mode of communications for the on-board equipment comprising the extended radio.

The extended radio can switch operation between the infrastructure and enhanced ad-hoc mode without having to resort to a global reset of the radio. A global reset is undesirable since all network associations are dropped, buffers are cleared, and timers are set to their default values. For legacy IEEE 802.11 radios, the MAC mode of operation can only be manually set by the user through a programming interface. An application executing as part of the processor module 138 dynamically switches between MAC operation modes. Switching between these modes is transparent to the user. By default, the extended radio operates in the enhanced ad-hoc mode. If the extended radio comes within range of an egress point and receives a beacon from the egress point or some other legacy IEEE 802.11 access point, a device driver generates a MAC signal that notifies the application. A prior art Wi-Fi radio operating in ad-hoc mode would simply discard the beacon. The application finite state machine uses the received MAC signal to initiate a transition to the infrastructure mode so that the participating vehicle can communicate with the egress point. Under some circumstances, if a vehicle-to-vehicle transaction is occurring then the switch to the infrastructure mode may be delayed. Otherwise, if the data collected by the on-board device exceed a threshold of the total capacity of the device, or the on-board device has a pending request such a request for routing directions, the application switches modes immediately.

The participating vehicle is configured to be able to associate with any egress point within range (for example using a BSSID set to "any"). A typical association and authentication process comprises a 2 or 4-way handshake, which, with off-the-shelf Wi-Fi equipment takes 50–1000 ms. The inter-access point protocol (IAPP) proposed in the IEEE 802.11 f working group provides mechanisms to establish communication between a plurality of access points using a distribution system (DS) over a TCP/IP or UDP/IP network transport protocol. In the hierarchical floating car data network, an egress point expedites the process of association with participating vehicles by sharing state information with other egress points regarding the participating vehicle at task. State information includes authentication, association, and authorization credentials. A credential may include information that uniquely identifies a participating vehicle, an end user, a Wi-Fi radio, a back-end billing account, timestamps, location, prior transactions, and the like. A credential is generated to authorize and protect the content between a first egress point and a participating vehicle. The credential can then be propagated to any other egress point in the network through a secure tunnel. Since a participating vehicle is likely to follow the same route a number of times (e.g. commute to work or school), an egress point can keep in its cache the credentials for that vehicle after the first encounter. If a participating vehicle communicates with the same egress point then the cached state information continues to be stored as is. Otherwise, after a certain period of inactivity an egress point can expunge an idle entry from the cache.

Proactive collaboration may take place between egress points that exist within a route that a participating vehicle repetitively follows. For instance, nearby egress points engage a selected state transfer if there is prior indication that a participating vehicle might follow a pre-identified common route. Also, an end user may have entered a destination into the on-board device. In this case, the first egress point that establishes communication with that participating vehicle learns the destination and the suggested urn-by-turn directions that the vehicle is likely to follow to reach its destination. The first egress point propagates this information to other egress points based on their location to the participating vehicle. In this way association, authentication and other control and management handshakes can be optimized in all but one of the egress points that a participating vehicle encounters.

Hysteresis is used to avoid false mode switching where an egress point becomes available for a very short period of time and then disappears. Preferably, the location of the egress point is such that it optimally faces both directions of traffic. In that case, a participating vehicle should receive a regular signal wherein the signal strength increases in strength as the vehicle approaches the location of the egress point. However, optimal egress point placement may not be possible, or multiple egress points may be co-located and interfere with each other. The interference causes misleading SNR and RSSI measurements. To overcome these issues, the application decodes the received beacons to determine the relative location of the participating vehicle to the egress points. Based on the relative locations, and the velocity and trajectory of the participating vehicle, it is determined whether to switch to the infrastructure mode, and which egress point to switch to, that is which channel to use if more than one egress points are within range. In an alternative embodiment, the location of the egress points within range is known to the participating vehicle and the hysteresis calculations are based on actual geographic distances.

Once the participating vehicle transitions to the infrastructure mode it stays there until it loses connectivity with the egress point. When it loses connectivity, the application sends a signal to the device driver to switch back to the default ad-hoc mode. To avoid long periods where a weak signal from an egress point is received for an extended period of time, the application chooses to prematurely switch back to the ad-hoc mode using the methods described above.

Position information from the GPS receiver as well as position information from enhanced dead reckoning is used to decide which egress point or access point to switch to in the case of AP footprint overlap. With AP footprint overlap, the power emitted from one egress point interferes with an area that is covered by another egress point. Since the on-board equipment communicates with only one access point at a time, even small signal variations can cause association flip-flopping, or switching back and forth between different egress points or access points. The position information is used such that, for example, the egress point closest to the participating vehicle is used even if there is another interfering signal unless there is substantial difference in the quality of the signal due to interference from the surrounding environment.

An automated transmit power control mechanism based on the location of a participating vehicle may be used to reduce interference and increase efficiency. For example, a participating vehicle reduces its transmit power level as it approaches an egress point location and conversely it increases its transmit power level as it moves away from an egress point location. In this way, interference and near-far power and delay capture effects are minimized leading to better utilization of the communication medium.

Turning back to FIG. 8 (with parallel reference to the modules described above of FIG. 6), the processor module 138 is in communication with the sensor/OBD module 144. The sensor/OBD module 144 collects and processes data. For example the latitude, longitude, altitude, and vehicle speed and direction from GPS signals are collected and processed. If GPS signals are not available, enhanced dead reckoning is used to derive vehicle coordinates. Velocity, direction, and altitude may also be available from the odometer, a compass, and a gyroscope. Other sensor measurements from the vehicles onboard diagnostics bus can be received by the sensor/OBD processing module 144. Information concerning the speed limit, address ranges, street names, types of roads, number of lanes, width of the lanes, road conditions, and the like may also be received. Additional information can be entered using voice commands, a keypad, or other input device as described above.

Updates to the on-board software, and in particular the communication protocols module 140, and the sensor/OBD processing module 144 can be performed automatically. New or updated version of the software components can be stored in the central server or at the egress points or both. As a participating vehicle comes within range of an egress point that comprises the newer software, a high priority upgrade process is executed. During this process, the new release of the software is downloaded from the egress point, or from the central server, through the egress point, to the on-board equipment of a participating vehicle. Alternatively, an end user can manually install new or updated software using a storage medium or a WLAN link with access to the Internet where an automated software upgrade procedure resides. After the new release of the software is downloaded to the on-board device it is checked for integrity errors. If no errors are found, a self-extracting process installs the new components making sure that there is always a fail-safe state maintained if for some reason the update process was interrupted or terminated by the end user or due to a power failure of the device. If errors are discovered in any of the steps involved in updating the on-board software, the device reverts to the last configuration and another attempt is made to download a new image of the update software from an egress point or the central server.

Figure 9:
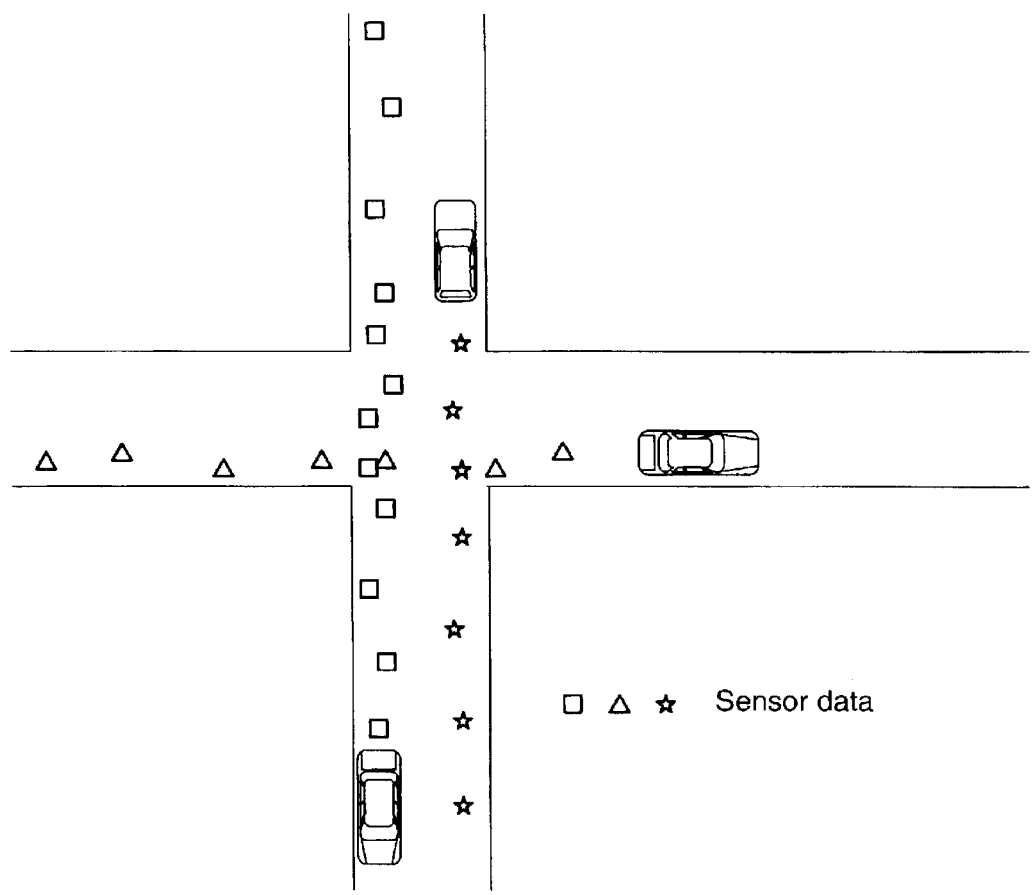
FIG. 9 shows measurement samples collected by multiple participating vehicles.

The communication protocols module 140 and the sensor/OBD module 144 communicate with the cache module 142. The cache module 142 collects data from the both modules. Cache module 112 of FIG. 6 collects data from wireless communication module 110 and wireline communication module 114. Wireline communication module 114 provides wireline connectivity, for example, a wired connection to the Internet. The processing module 144 may collect position and status samples regularly or irregularly as shown in FIG. 9. For example, an inertial sensor in a participating vehicle can output samples every 0.1 seconds, and an off-the-shelf GPS receiver can output data every 1 second or more. The on-board equipment uses an interrupt-based approach that allows all sensor devices to communicate new measurements to the processor as they are received. A peripheral interrupt controller (PIC), which is usually embedded in the processor, permits real-time interrupt priority assignment so that no blocking occurs between two or more sensors. Thus, all sensor values are collected by the cache 142 and processing can take place.

Figure 10:
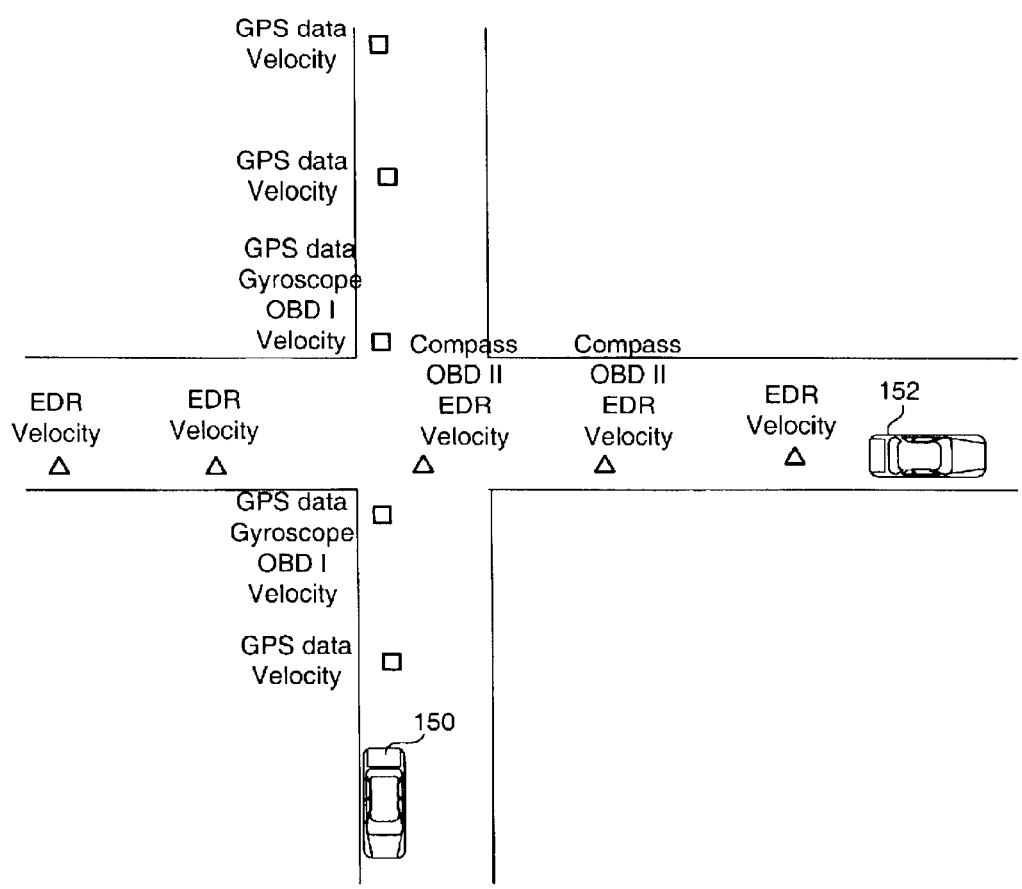
FIG. 10 shows different measurement types collected by multiple participating vehicles.

Since participating vehicles may have different on-board equipment, they may collect different measurements. FIG. 10 shows different measurement types collected by two participating vehicles 150, 152. The on-board equipment of vehicle 150 comprises a GPS receiver and records GPS position data as shown by the squares. Vehicle 152 uses a compass and enhanced dead reckoning to compute is its current position as shown by the triangle.

After collecting a new sensor measurement, the measurement is cached along with a timestamp assigning a chronological order to the sample. The sample may also be filtered. A filtering process is invoked asynchronously after receiving the new sensor measurement. The filtering process accepts some measurements and rejects others. The filtering process calculates differences between successive samples. That is, samples are evaluated based on their timestamp and the time deltas are maintained. An anchor entry holds a baseline reference entry and all other entries are represented as a delta offset from the anchor entry. If the difference between samples falls below a threshold then the entries are substituted by their average. If entries have the same value, for example, if the vehicle is stopped, redundant entries are discarded.

Figure 11:
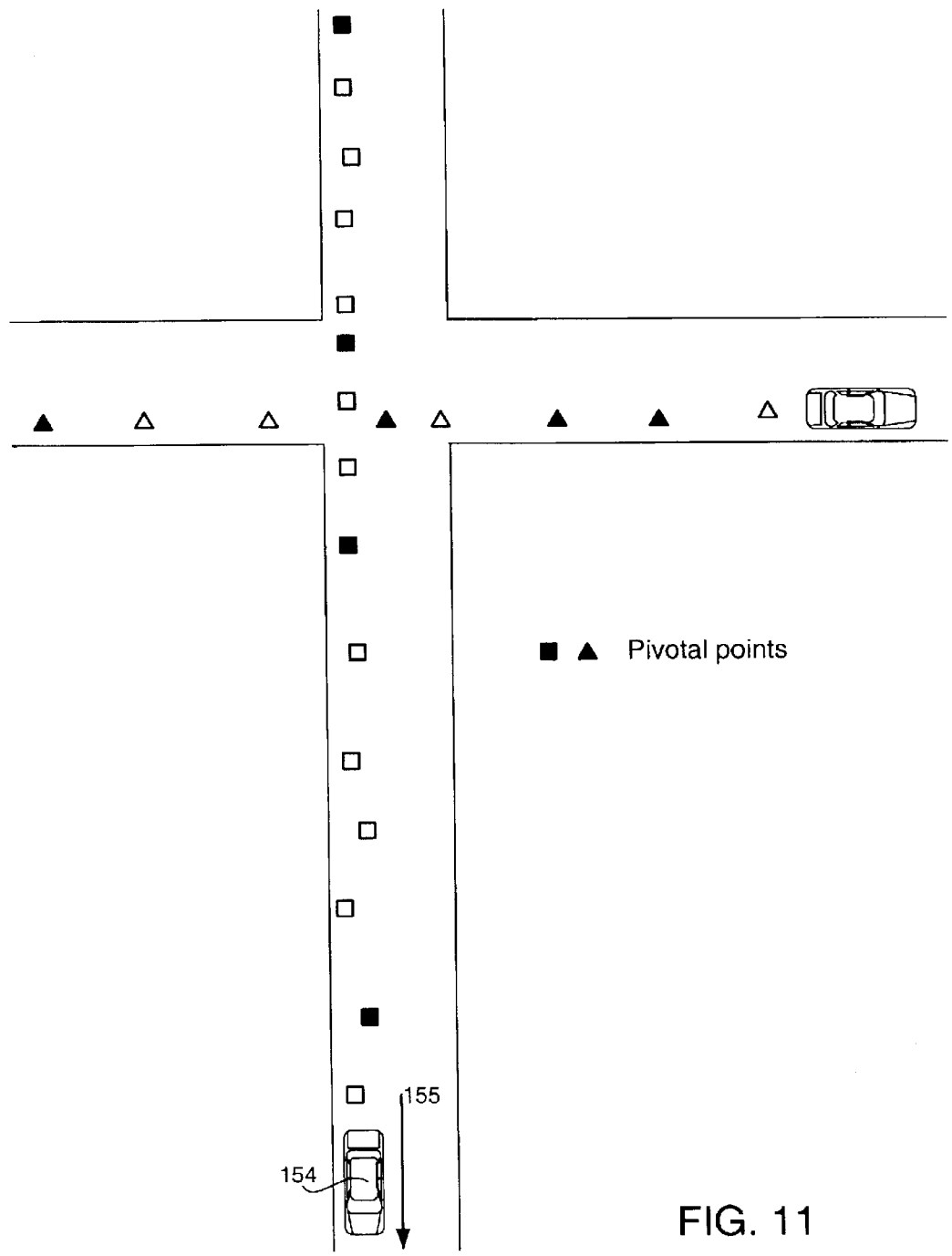
FIG. 11 illustrates pivotal points used for on-board data collection.

Prior art databases use begin and end point coordinates to form a road segment. Real roads are represented by connecting several road segments. Road segments allow only the static geometry of the roads to be captured. An on-board geographic database for each participating vehicle can be created on the basis of traffic flow segments rather than road segments. Pivotal points, as indicated by the black squares and triangles of FIG. 11, represent begin and end point coordinates of traffic flow segments. A sample is considered a pivot point if the previous and next sample differ significantly in either direction or velocity. For example, vehicle 154 of FIG. 11 is moving in the direction indicated by arrow 155. As can be seen from the samples indicated by the squares, vehicle 155 maintains the same direction but reduces its speed around the intersection of the roads. Pivot points are chosen as vehicle 154 slows down and speeds up.

Since a traffic flow segment can be shorter than a prior art road segment, generally a relaxation rule is applied to the geographic representation of a polyline comprising many road segments that aggregates a number of small prior art road segments into a single traffic flow segment. Referring back to FIG. 11 almost all samples can be considered end-points of a prior art road segment whereas only the pivotal samples are the end-points used to represent a traffic flow segment. There is a direct relationship between the accuracy of the representation of a road and the amount of pivotal points used.

A database representation based on traffic flow segments is well suited for the onboard navigation systems of participating vehicles. The navigation systems continuously calculate multiple routes and suggest an alternative using current road congestion conditions. A traffic flow segment database representation not only saves storage space but also lends itself to efficient, innovative routing algorithms which operate on pivotal points rather than road decision nodes such as intersections, off-ramps, and the like.

In another filtering process, sensor samples are processed using caching techniques based on application monitoring in order to do a buffer read-ahead or decide on the replacement policy. For example, a virtual storage access method (VSAM) can be used. VSAM is a data management system that supports key sequenced data sets (KSDS), entry sequenced data sets (ESDS), and relative record data sets (RRDS), making it very good at efficiently manipulating large amounts of data.

After pivotal sensor points are selected, a smoothing function such as least-squares fitted to cubic equation, or a Kalman filter, connects the sample points to produce a vehicle trace. An outlier removal process is applied if some of the pivotal points have a distance that exceeds a threshold from the produced vehicle trace. After the outlier removal process, a smooth curve is recalculated based on the remaining pivotal points. Using the accuracy set parameter the process automatically generates shape points on the pivotal data on a segment by segment basis. Any smoothed pivotal data not needed to satisfy accuracy requirements are discarded.

Figure 12:
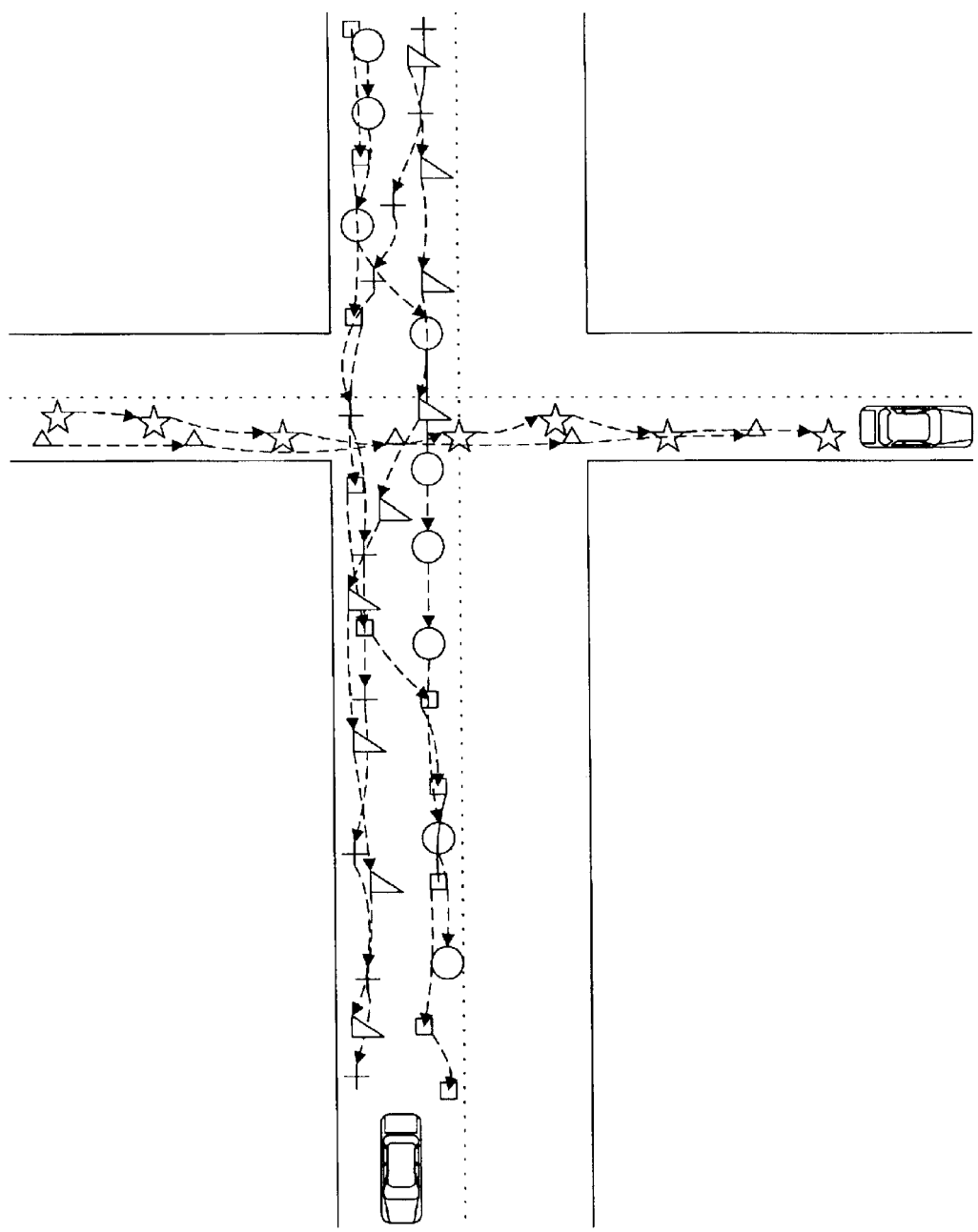
FIG. 12 shows traces of multiple participating vehicles used for a centerlining method.

Centerlining is used to deduce cartographic information since the participating vehicle may be driving in the right-most lane, the left most lane, in other lanes, or may be switching lanes. FIG. 12 shows traces from multiple participating vehicles. By analyzing traces or traffic flow segments from a large number of vehicles, an automated process can determine if a road segment has multiple lanes in one direction or in multiple directions. Taking the average over all traces from a plurality of participating vehicles traveling in the same direction is sufficient to determine the center of the roadway.

The enhanced ad-hoc mode and hierarchical floating car data network enables the accumulation and sharing of multiple traces from participating vehicles. A user does not need to know the exact characteristics of the road, nor does a user have to travel on the road in any pre-specified manner or speed. Instead, merely by using a plurality of traces from normal travel, additional database context can be generated to describe the width of a lane or road segment, the number of lanes available, the geometry of a complex intersection, and the like. For example, the width of a road segment is the minimum and maximum traces after the removal of the necessary outliers. The number of lanes can be determined from the density distribution of collected traces. Since every trace is associated with a timestamp, if a number of simultaneous but space separated traces are collected on the same road segment then that number of traces can be used to count the lanes available at that portion of the road network.

Traces from participating vehicles include speed and direction in addition to location coordinates. By using traffic flow segments represent of the road network in the database, dynamic routing guidance algorithms can be made more accurate and detailed. By observing traffic flow patterns of previous samples for a route over a time period, impedance weights can be assigned to intersections, bridges, traffic lights, stop signs, and the like, based on the estimated time it takes for a vehicle to move past that entity. For example, entering a freeway in the commute hours might include a traffic flow metering light that on average requires several minutes of wait time. Alternatively, in some complex intersections making a left-turn might take more time that going through the intersection and then making a u-turn followed by a right turn.

Prior art navigation solutions always have to cope with a large number of route decision choices that exist due to the amount of roads available in a geographic area. While the majority of those choices are meaningless from the perspective of an end user, a turn-by-turn routing algorithm cannot easily be programmed to avoid the meaningless choices. By using traffic flow segments along with content from the hierarchical floating car data network a participating vehicle may use prior identified patterns to optimize the organization of the on-board navigation database. For a participating vehicle that commutes most days of the year between the same few locations a database is formed comprising navigation and real-time traffic guidance for the areas of interest. Other areas can be included in the on-board database selectively using the likelihood that an end user might need them at some point. In one example, areas or roads within a short distance from locations of interest may be included. In another example, common routes chosen by a large population of participating vehicles in the past may be included.

An electronic map update is needed when an old map in an on-board database becomes obsolete (e.g. every quarter), or when a vehicle travels to a new geographical area. The map of the on-board database is updated using features and content from the end user's driving patterns. The amount of storage usually required for a complete map is such that only one major metropolitan area can be stored in an on-board navigation device. For example, a participating vehicle with 100 MB of on-board storage capacity dedicated to storing a geographic database may be sufficient to store a map image of the entire San Francisco Bay Area. If the end user needs to update the map database or travels outside the Bay Area, for example to Las Vegas, Nev., a new map has to be downloaded to the on-board navigation device erasing at least portions of the previous map database in order to free some storage space. By way of the hierarchical floating car data network, the end user receives map updates continuously as long as there is an egress point or another participating vehicle within range. The on-board database is continuously reorganized to reflect the importance of the available content compared to the end user's behavior. Areas where an end user travels are characterized as high-value content; areas nearby prior collected traces are characterized as medium-value content; areas far away are characterized as low-value content. Through this database organization, when new content or updates become available, space is freed from the low-value content and replaced with the newly received information. For the vast majority of end users the on-board database comprises approximately 10% high-value content, 25% medium-value content, and 65% low-value content. An end user can configure the database to classify content as desired.

Returning to the Las Vegas example, when the trip to Las Vegas is taken the low-value content is deleted to make room for installation of the new dataset. By default, when traveling to a new area an attempt is made to install all available information. In the extreme case that the storage space required to install all available information is insufficient even after deleting all low and medium-value content, a smaller portion of the new database image is added to provide fundamental support for the new area. As the end user spends more time in the Las Vegas Area, the relative content characterization adapts to the new observed patterns, downgrading content from the San Francisco Bay Area and eventually completely deleting the Bay Area content if necessary. If, on the other hand, the end user returns to the Bay Area after only a few days in the Las Vegas Area, much of the content from that Bay Area database is still available and the content from the Las Vegas area is downgraded and purged from the navigation device. The end user may adjust the responsiveness of the on-board database to new content, unlike in the prior art, wherein an end user must perform a manual and complete database overwrite when installing a new dataset.

Referring back to FIGS. 6 and 8, the interface module 136 of FIGS. 8 and 106 of FIG. 6 serves as an interface between the processor module 138 and the modules comprising the navigation module 126 (98), the routing module 128 (108), the cartography module 130 (102), and the maneuver module 132 (104). The interface comprises a wrapper function to translate external events and actions into a format compatible with the database application. The database may be modified and those modifications applied to a variety of applications. Metadata tables, replacement routines and other known methods may be used to signal changes needed in a database. Some embodiments may not comprise an interface layer.

The navigation module 98 and 126, the routing module 100 and 128, the cartography module 102 and 130, and the maneuver module 104 and 132 arc all in communication with the geographic database 96 and 124. The navigation module searches the database for current location and next direction information. The routing module uses at least some of the information obtained from the navigation module search and also searches the database for complete turn-by-turn directions to a destination. The cartographic module uses at least some of the information obtained from the navigation module search to display portions of the map pertaining to the region of travel if an onboard display or monitor is available. The cartographic module also performs addition searches of the database in order to improve accuracy of the map. The maneuver module, which operates when a vehicle deviates from its current route, calculates a new path so that the vehicle returns on a correct path to its destination.

Figure 13:
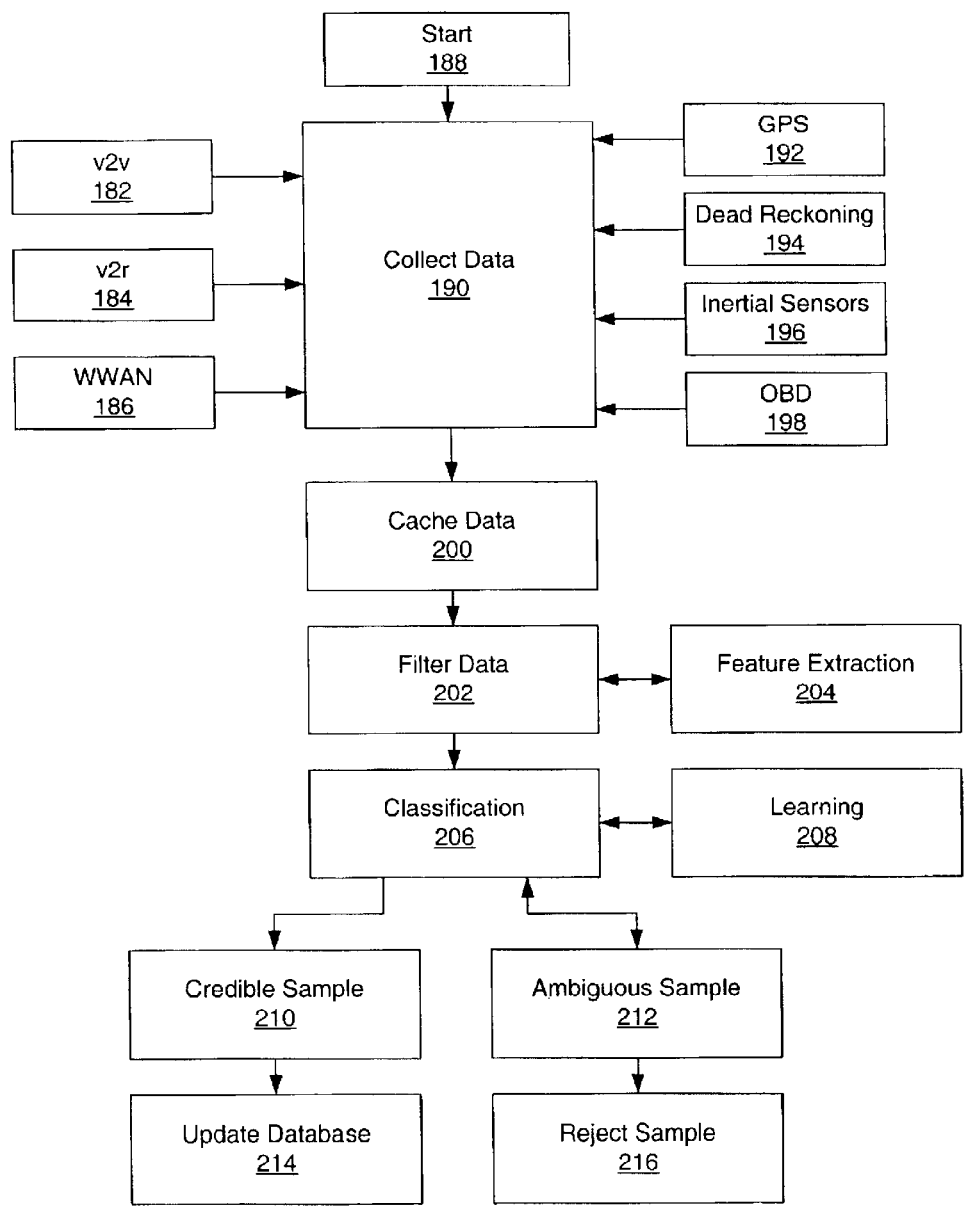
FIG. 13 illustrates an on-board data collection process of on-board equipment.

FIG. 13 illustrates the on-board data collection which was described, in large part, above. After the process start 188, a participating vehicle collects data 190. The collected data is cached 200 and filtered 202. Next, the cached data is classified 206. Then the credibility of the classified data is determined 210 and if the classified data is determined to be credible, the database is updated 214. If the classified data is determined to be ambiguous 212, then the classified data is rejected 216. Alternatively, ambiguous classified data may be stored for additional filtering and classification. As shown in FIG. 13, as well as described above, data is collected from v2v communications 182, v2r communications 184, WWAN communications 186, GPS measurements 192, dead reckoning 194, inertial sensors 196, and OBD 198.

The filtering 202 performs feature extraction 204. Feature extraction identifies distinguishing features that are invariant to certain transformations of the input data. For example, when content is accumulated from participating vehicles, an on-board feature selector algorithm may identify features such as popular routes, population centroids, congested segments and the like. Part of the feature extraction process for an on-board navigation system creates domains that contain information related to the end user's needs.

Classification 206 uses the domains and features from the feature extractor process to assign new information to the right category. The classification process includes learning 208. Learning uses prior information to better classify new information. One primary function of the classification process is to deal with the variability of new data so that useful new data are not discarded as noise when a condition is not met.

To determine if classified data is credible 210 to update the database 214, statistical reference values are defined based on additional context. For a coordinate adjustment of a road or a road segment the statistical size needed is inversely proportional to the size of the change. For example, when more than 10 participating vehicles within one hour suggest a database modification, then their average is calculated and the new coordinates are added in the local database along with a credibility probability. As more participating vehicles contribute more new data, a new average is calculated and a higher credibility probability is used to characterize the update information. Data can also be classified by average, median, variance, frequency histograms, percentiles and the like.

If the participating vehicles use a new flow direction or intersection turn, then statistical samples are constructed. Large samples of more than 100 participating vehicles are needed to assign considerable credibility probability. For example, providing a local database where a road segment is bi-directional, a large statistical sample is accumulated that demonstrates that all participating vehicles traveling that particular segment are traveling in the same direction. Additionally, the centerlining process for the same road segment reveals a combined trajectory that lies approximately in the middle of the two previous trajectories used to represent the two opposite flows of traffic. This indicates that the road segment has changed from a bi-directional road to a road with only one direction of traffic.

There is a trade-off between the statistical sample required to make a change in the database and the responsiveness of the system. For example, in many European countries, when under sever asymmetric traffic flows, more lanes from opposite directions might be allocated to the congested flow for just a few hours. In such a case, a change to the database is only made after a high volume of vehicles produces a credible statistical sample.

As discussed above, the on-board equipment executes an application and the baseline radio operates to transmit and receive data packets. Particularly, an application finite state machine creates beacon service table (BST) and vehicle service table (VST) packets as described in U.S. patent application Ser. No. 10/272,039. BST packets comprise information of only the transmitting participating vehicle and VST packets comprise information of the transmitting participating vehicle as well as other participating vehicles. The application generates BST and VST packets and sets the transmission frequency of the BST and VST packets that ensures stable network operation, even with an extremely high concentration of participating vehicles. The application also uses other methods to increase the probability that the transmitted packets will be received. One method uses controlled packet lengths and data rates for optimal signal-to-noise (SNR) ratios. Another method transmits the packets a multiple number of times.

Upon receiving a packet, the baseline radio captures the packet. The application finite state machine then inspects the contents of the packet. For example, the application calculates routing costs for the trajectory that the participating vehicle must travel to reach its destination. Using information received from other participating vehicles traveling in the opposite direction, the aggregate flow velocity is estimated, a cost is assigned to the corresponding road segments, and a shortest path tree (SPT) routing algorithm is invoked to determine faster, alternative routes. Alternative routes are communicated to the user only when there are substantial benefits in time or distance. This also eliminates over-shooting wherein congestion is transferred to the alternative route because too many users are instructed to follow the alternative route. The application also alerts the driver of upcoming collision dangers when the flow velocity reduces suddenly shortly ahead of the participating vehicle.

The extended radio also makes use of BST and VST packets to communicate the trajectories of participating vehicles. For the transmission of packets, the application communicates with the filtering module to create BST and VST packets comprising the vehicle's trace.

Figure 15:
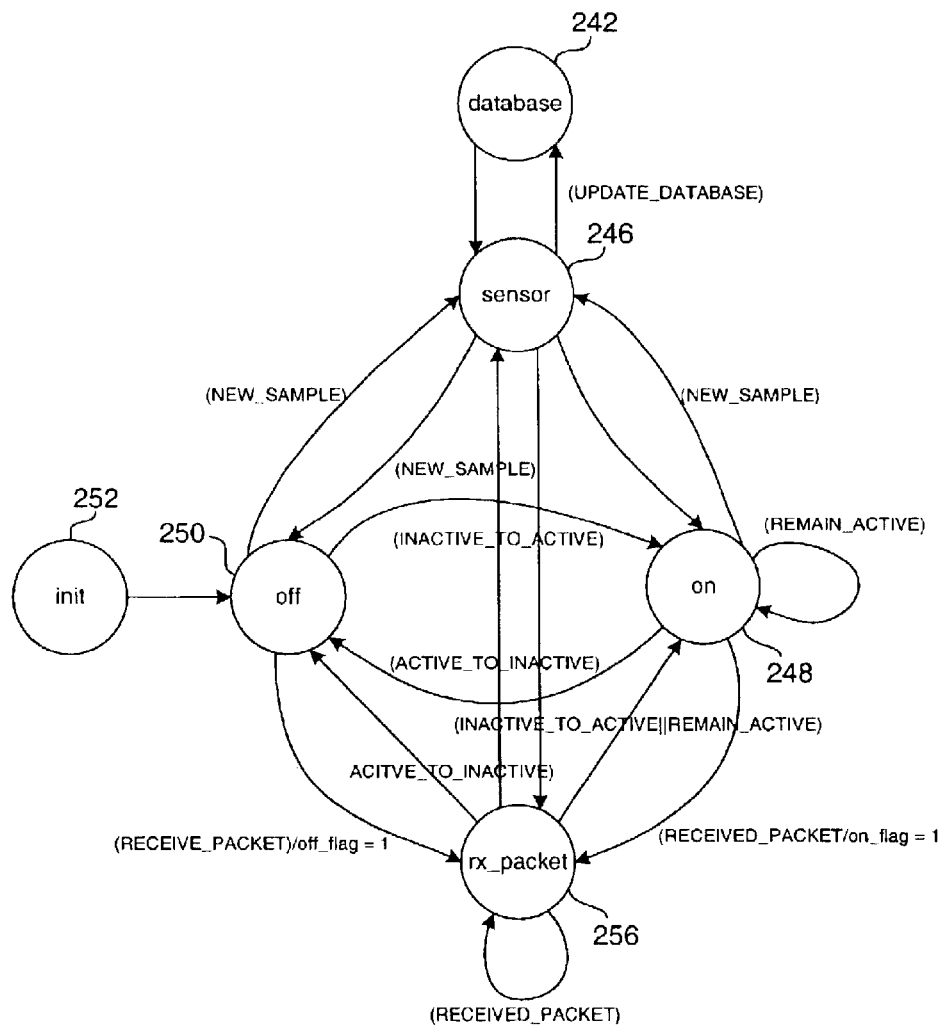
FIG. 15 shows a state machine of the on-board equipment.

FIG. 15 shows a finite state machine for the application. The state machine begins at the init state 252 where all initializations occur. Next a transition from the init state 252 to the off state 250 occurs. Then, according to a simulation timer, a transition occurs from the off state 250 to the on state 248.

In the on state 248, the application constructs packets of digital data. Packets are constructed of a limited and variable length. The limited and variable length nature of the packet significantly increases the probability that other on-board equipment, or mobile communication devices, receive the packet of digital data as described in U.S. patent application Ser. No. 10/272,039. Since the participating vehicle may be required to transmit or receive large volumes of data, the extended radio selectively sets the packet size to the maximum allowed length as specified by the IEEE 802.11 standard, which is 2,304 bytes.

Figure 17A:
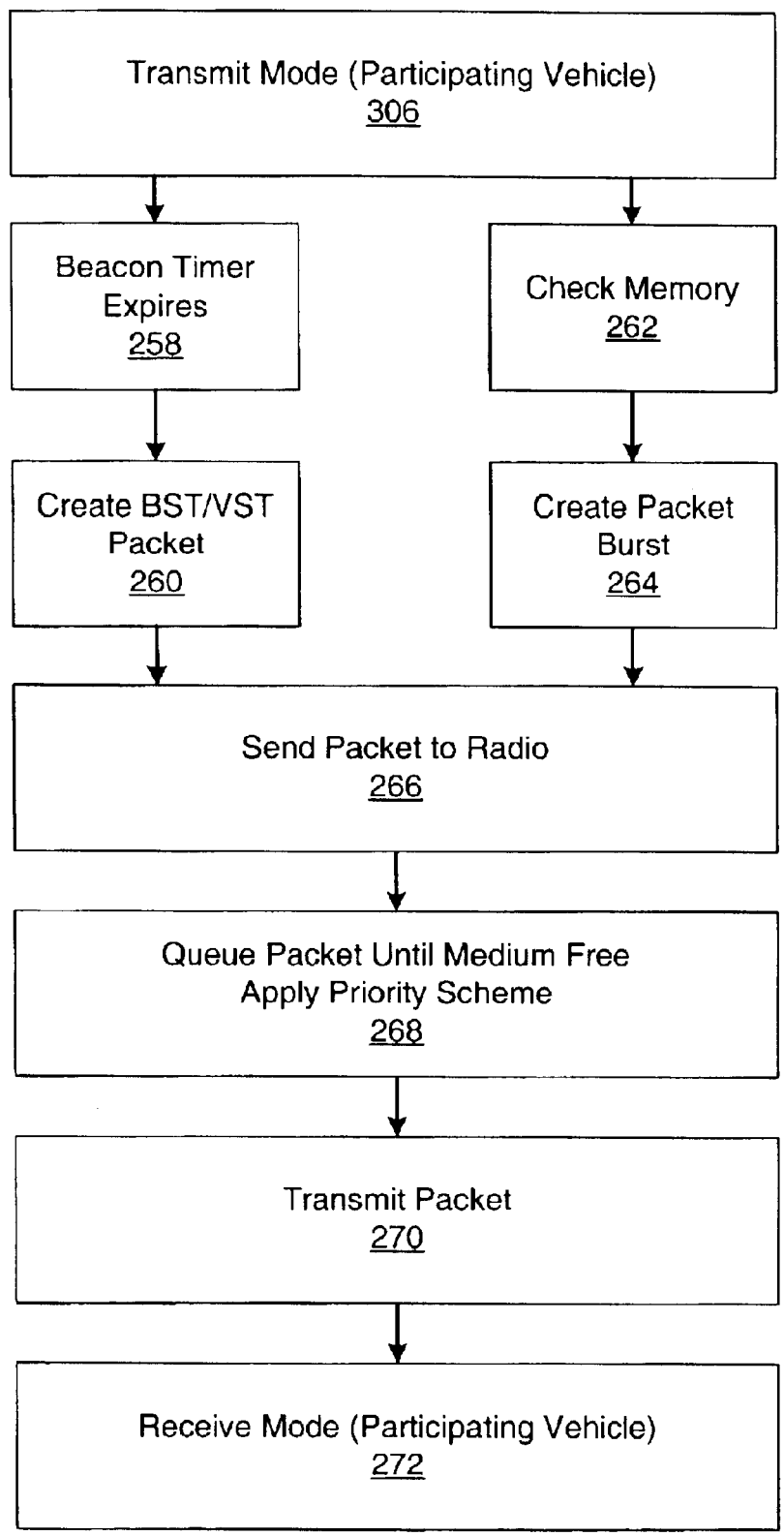
FIGS. 17A–D show infrastructure mode packet transmitting and receiving methods between a participating vehicle and an egress point of the hierarchical floating car data network.

FIGS. 17A–D and FIGS. 18A–B collectively illustrate methods for communicating between elements, that is participating vehicles and egress points, in the hierarchical floating car data network. FIG. 17A shows an infrastructure mode packet transmitting method for a participating vehicle. If a beacon timer has expired 258 a beacon service table or a vehicle service table is created 260. Concurrently, if the volume of local data exceeds a memory threshold 262, the application module creates a packet burst 264. The packet burst comprises information for the on-board equipment storage and is ready to be transmitted as soon as the vehicle establishes communication with an egress point or other participating vehicles. The packet burst has a variable size of several kilobytes. The packet burst or beacon service table packet or the vehicle service table packet is sent to the radio 266. As the packet burst reaches the radio layer 266, it is fragmented using the packet length rules described above and then encapsulated in a regular IEEE 802.11 data packet format. Using the 1-bit more header flag located in the MAC header of every IEEE 802.11 encapsulated packet a train of packet fragments is sequentially transmitted as defined in the IEEE 802.11 standard.

A packet burst can preemptively occur even if a BST or VST is queued for transmission 268. Specifically, when in ad-hoc mode, the application broadcasts BS T and VST packets in the same manner as described for the baseline radio in U.S. patent application Ser. No. 10/272,039. Additionally, the application broadcasts packet bursts along with the BST and VST packets. A participating vehicle that broadcasts packet bursts can purge data packets from its storage area if at least one other participating vehicle has acknowledged the reception and custody of the packet burst.

The packet or packet burst at the radio is queued 260, which includes applying a priority scheme. Next, when the medium is idle, the packet is transmitted 270 and the participating vehicle transitions to a receive mode 272. As will be described with reference to FIGS. 17B–C, after transmission of the packet burst to an egress point, the egress point will issue a negative acknowledgment packet to the participating vehicle in the event that the packet burst was not received properly or rejected by the egress point. The negative acknowledgement packet is received by the participating vehicle as will be described with reference to FIG. 17C.

Since in the infrastructure mode there is usually a small time window within which to transmit and receive data, throughput is maximized albeit at the risk of losing some data packets. Therefore, it is desirable that a participating vehicle that comes within range of an egress point uploads as much data as possible and receives a confirmation from the egress point so that it can purge the data from storage or memory thus freeing up storage space for more data. Unicast data packet exchange is used in the infrastructure mode and the default IEEE 802.11 MAC layer retransmission mechanism is used for instances in which a packet was not received successfully.

Figure 17B:
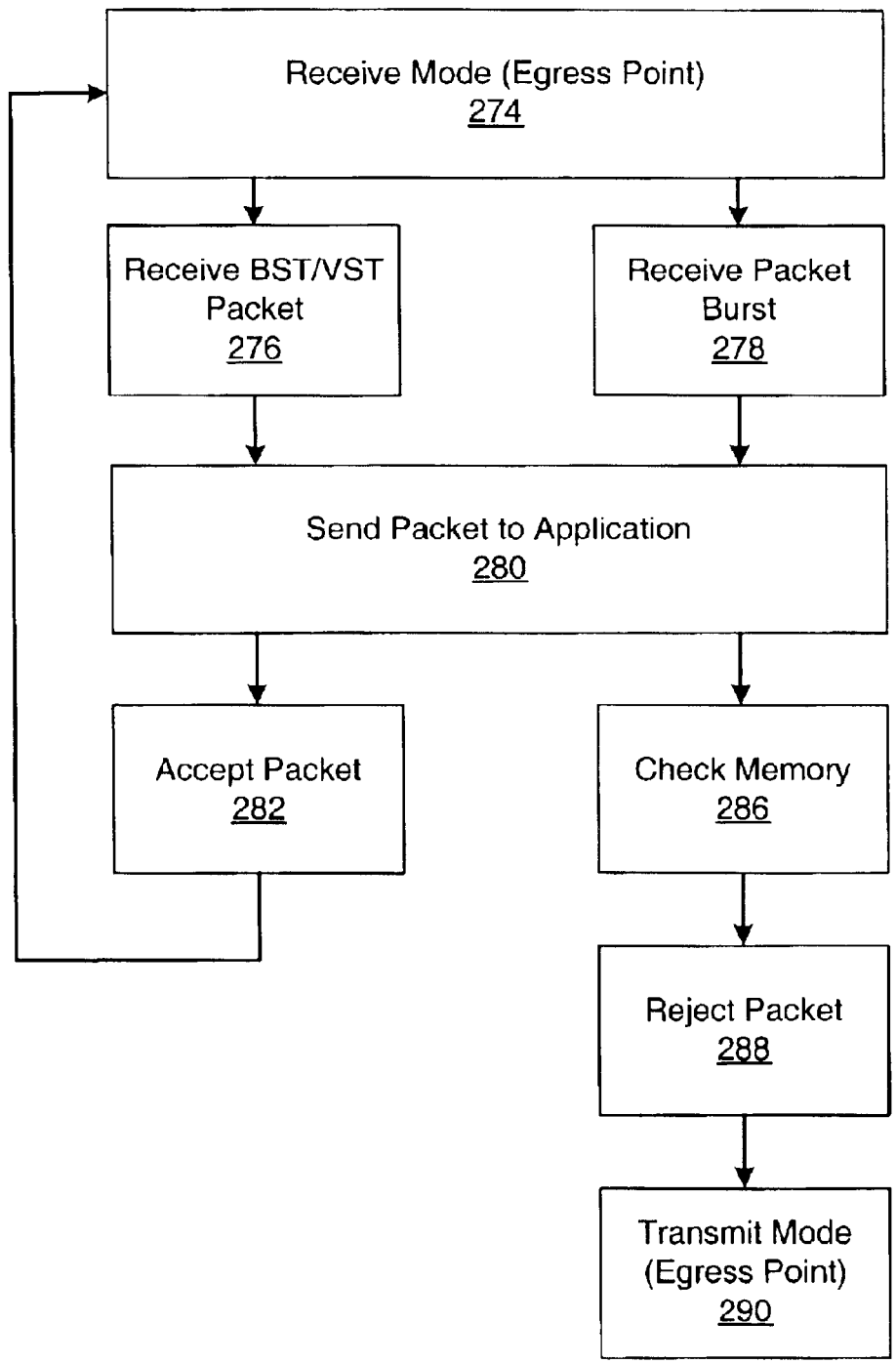
Figure 17C:
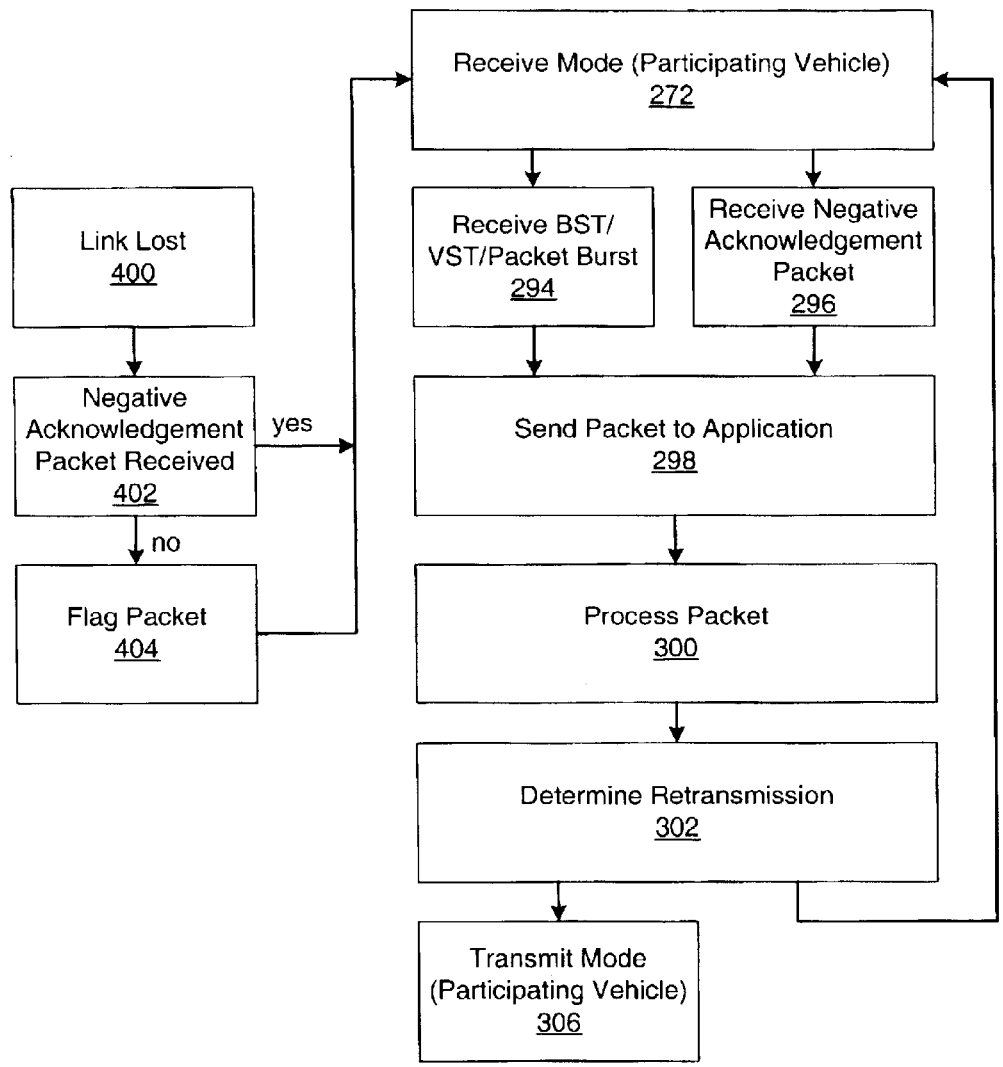
Figure 17D:
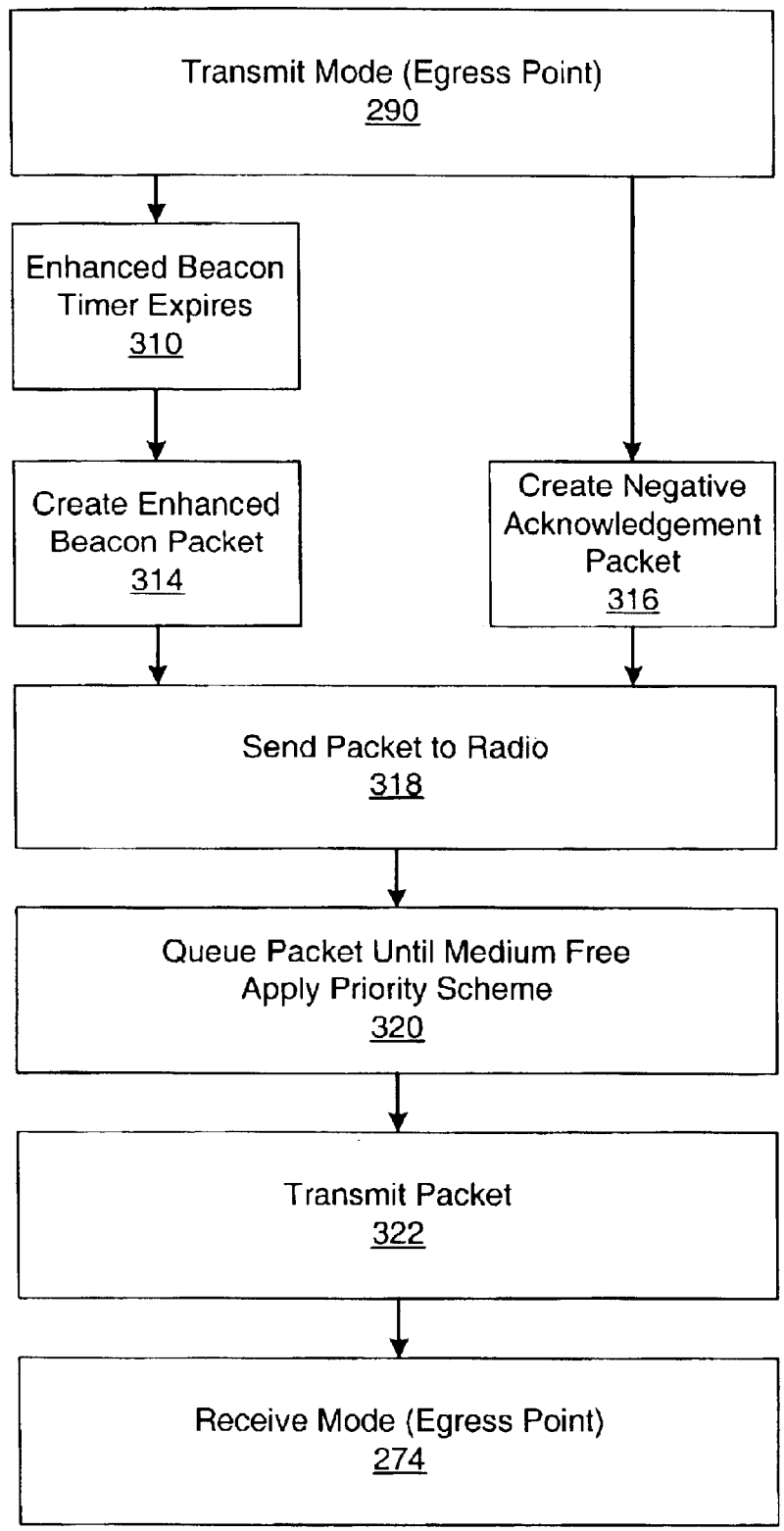

FIG. 17D shows an infrastructure mode packet transmitting method for an egress point. An egress point transmission sequence begins when an enhanced beacon timer expires 310, or when a the reception of a packet burst is rejected 290. Rejected packet bursts will be described with reference to FIG. 17B. An enhanced beacon packet 314 is created when the enhanced beacon timer expirees 310, or a negative acknowledgment packet 316 is created if the packet burst is rejected (288 of FIG. 17B). The enhanced beacon packet or the negative acknowledgement packet is sent to the radio 318. The packet at the radio is queued 320 which includes applying a priority scheme. The queued packet is transmitted 322 when the communication medium is idle, and the radio returns to the default receive mode 274. The application running at the egress point does not provide positive acknowledgements for performance reasons.

FIG. 17C shows an infrastructure mode packet receiving method for a participating vehicle. In the receive mode 272, the participating vehicle receives a beacon service table or vehicle service table packet or packet burst 294, or a negative acknowledgment packet 296. The negative acknowledgement packet is transmitted by egress point when the reception of a packet burst sent by the participating vehicle is rejected (FIGS. 17B and 17D). The received packet 294 or 296 is sent to an application 298. The packet is processed 300 by the application. It is determined if the packet burst should be retransmitted 302. If a negative acknowledgement was received, the packet burst is retransmitted by transitioning to the transmit mode 306. The packet burst is retransmitted after a randomly chosen backoff interval or the retransmission is deferred until another egress point is within range. This decision 302 is depends on the reason for the failure to receive the packets as specified in the negative acknowledgement. If an immediate retransmission is determined a transition to the transmit mode occurs 306. If transmission is not necessary the radio transitions to the default receive mode 272.

Concurrent with the receive mode, the link with the egress point is monitored. If the link is lost 400, that is the participating vehicle loses communication with the egress point, it is determined if a negative acknowledgment was received 402 while the link was active. If a negative acknowledgement was not received it is assumed that any transmitted packets were successfully received by the egress point and those packets are flagged 404. Flagged packet may be deleted by the participating vehicle. Next a transition is made to the receive mode 272. If a negative acknowledgment was received the radio transitions to the receive mode 272 and the packets are not deleted.

FIG. 17B shows an infrastructure mode packet receiving method for an egress point. In the receive mode 274 the egress point receives a beacon service table or vehicle service table packet 276, or a packet burst 278 from a participating vehicle. The packet 276 or 278 is sent to the application 280 where it is either accepted 282 or rejected 288. The packet is rejected 288 if a memory threshold is exceeded 286. If the packet is accepted the egress point radio remains in the default receiving mode 274, otherwise a transition occurs to the transmit mode 290 whereby a negative acknowledgement packet is created and transmitted to the participating vehicle as described above.

Figure 18A:
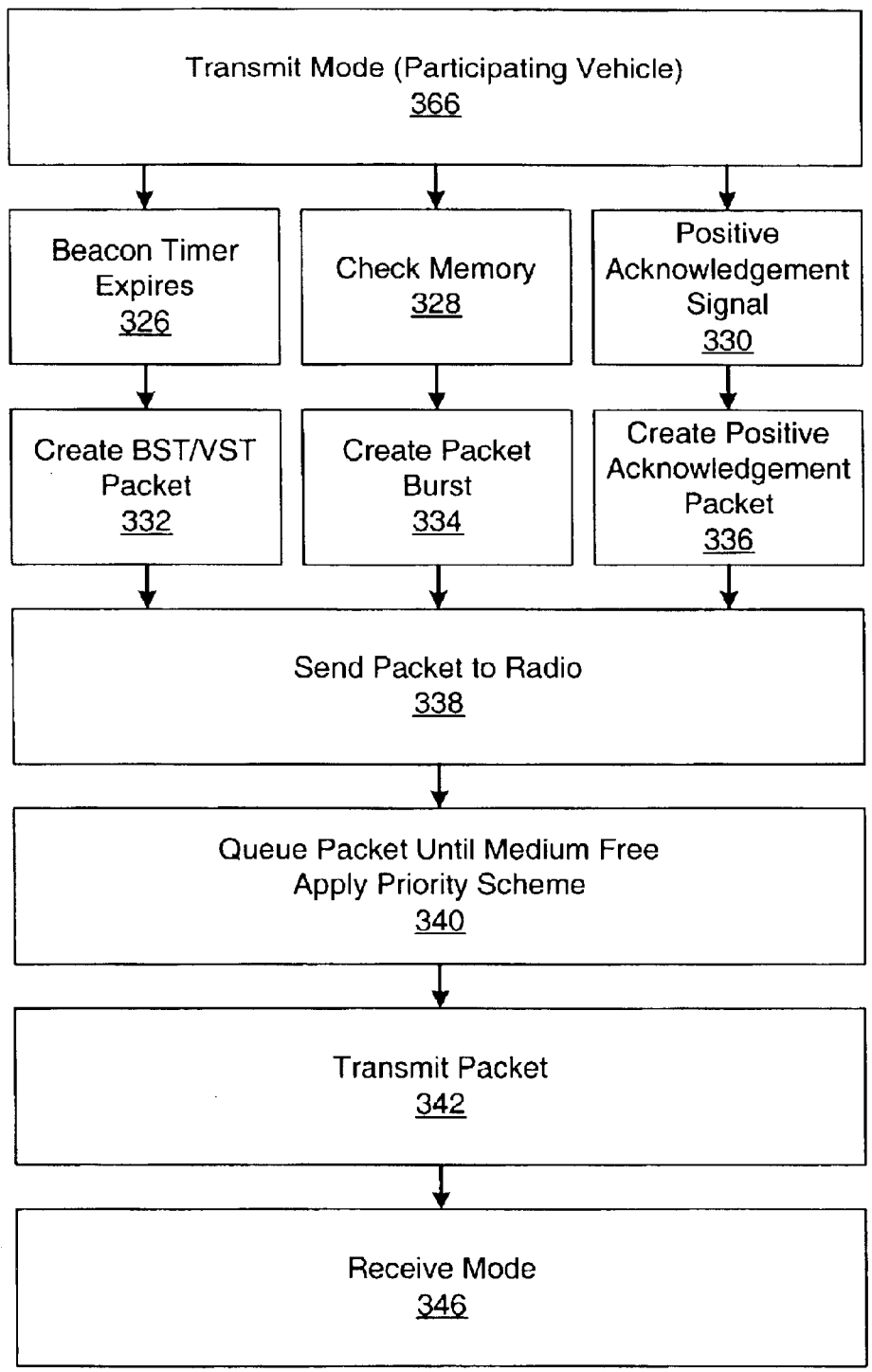
FIGS. 18A–B show ad-hoc mode packet transmitting and receiving methods between participating vehicles.
Figure 18B:
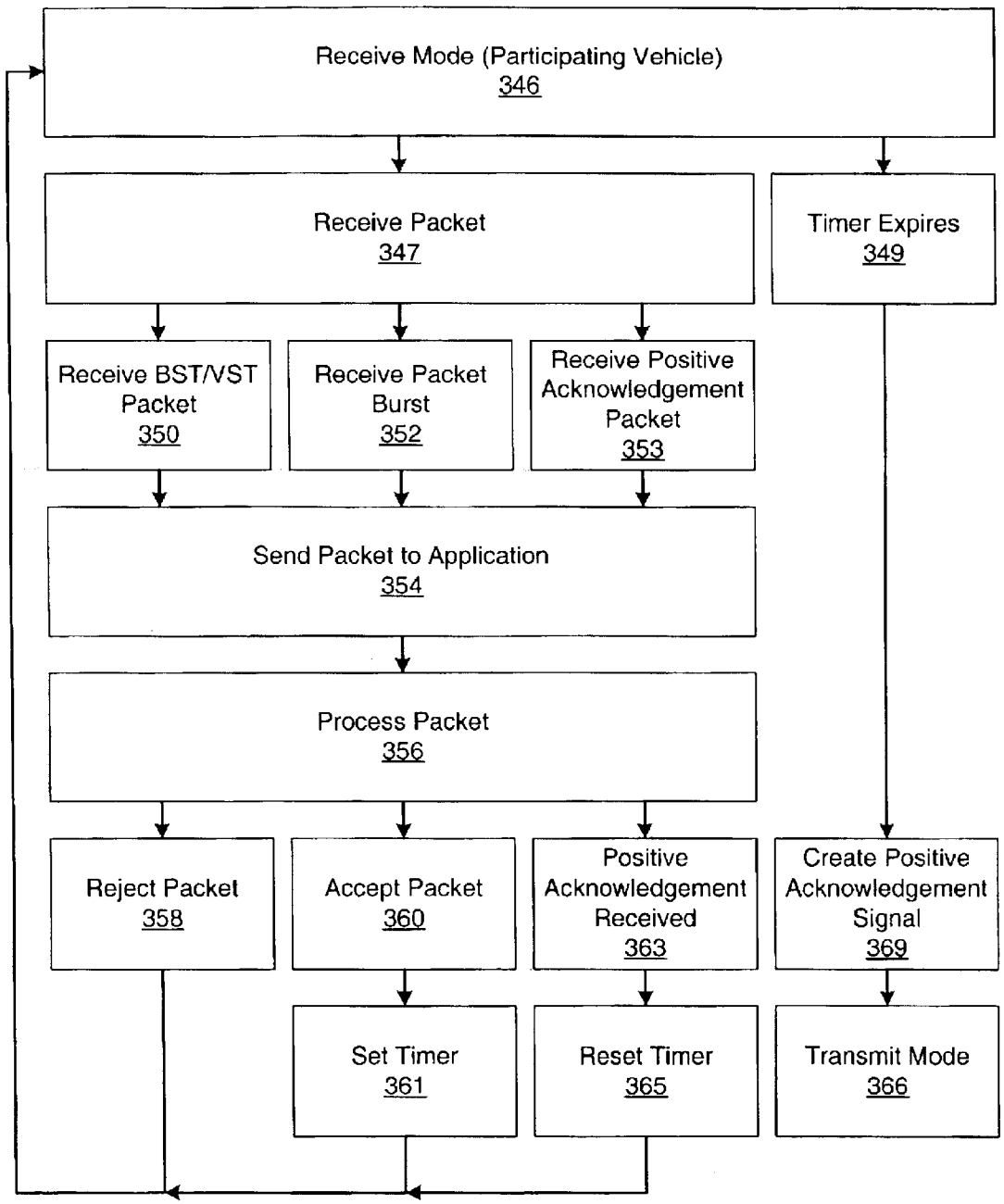

FIGS. 18A–B show ad-hoc mode packet transmitting and receiving methods between participating vehicles. In the ad-hoc mode the amount of time that two or more participating vehicles can communicate within varies from very small in the case of vehicles traveling at high speeds in opposite directions, to very large for vehicles moving in the same direction at substantially equal speeds. For broadcast only communication links, all packet exchange is unacknowledged at the media access controller (MAC) layer. The application at the receiving vehicle generates a positive acknowledgement packet after a randomly chosen time offset to indicate that the receiving vehicle has taken custody of the received packet. To avoid the case where many receiving vehicles simultaneously transmit a positive acknowledgment packet after receiving an identical broadcast packet, a timer at each participating vehicle is randomly set. Any participating vehicle that receives a packet from another participating vehicle before its randomly set timer expires does not transmit the positive acknowledgement.

FIG. 18A shows an ad-hoc mode packet transmitting method for a participating vehicle. In the transmit mode 366, the participating vehicle will transmit a packet when a beacon timer expires 326, when a memory threshold is exceeded 328, or when a positive acknowledgement is required 330 after the randomly chosen time. If the beacon timer has expired 326 a beacon service table or vehicle service table packet is created 332. If the memory threshold is exceeded 328 a packet burst is created 334. If a positive acknowledgement is needed 330 a positive acknowledgement packet is created 336. The packet 332, 334, or 336 is sent 338 to the radio. The packet is queued 340, which includes applying a priority scheme. The queued packet is transmitted 340, and the radio transitions to a receive mode 346.

FIG. 18B shows an ad-hoc mode packet receiving method for the participating vehicle. In the receive mode 346, either a packet is received 347 or a timer expires 349. The timer was described above in accordance with positive acknowledgements. The received packet may be a beacon service table or vehicle service table packet 350, packet burst 352, or a positive acknowledgement 353. The packet 350, 352, or 353 is sent to an application 354. The packet is processed 356 by the application where it is determined whether the packet should be rejected 358, accepted 360, or if the packet is a positive acknowledgement 363. If the packet is rejected 358 the radio transitions back to the receive mode 346. If the packet is accepted 360, the timer with a random offset for a positive acknowledgment signal is set 361, and the radio transitions back to the receive mode 346. If the processed packet 356 is a positive acknowledgement packet 363, the timer is reset 365, and the radio transitions back to the receive mode 346. If the timer expires 349 before a positive acknowledgement is received 347 from another participating vehicle, a positive acknowledgement signal is generated 369, and a transition is made to the transmit mode 366. The positive acknowledgement signal 369 causes the creation of the positive acknowledgement packet 330 and 336 as described above in accordance with FIG. 18A. Multiple positive acknowledgement packet transmissions from multiple participating vehicles are reduced since only a few positive acknowledgements are transmitted before all participating vehicles within range reset their timers. Alternatively, positive acknowledgements may be transmitted from only those participating vehicles with stable, high quality communication links. Furthermore, current location and trajectory may be used to determine which participating vehicles should issue positive acknowledgements.

The decision to accept 360, or take custody of the packet burst, or reject 358 the packet burst is based on the amount of resources available at the participating vehicle as well as its trajectory and connectivity. When a participating vehicle has an excessive amount of data stored in its memory, and another participating vehicle has very little data in its memory, the first vehicle transmits some of its data to the second vehicle. The trajectory of a participating vehicle is-considered in ascertaining whether to assume custody of data from other participating vehicles. If a participating vehicle is moving towards an egress point, then accumulated data can be uploaded to a higher layer of the hierarchical floating car data network, and from there to other participating vehicles. In this way, a participating vehicle acts as a mobile router, transferring data from other participating vehicles to an egress point. Alternatively, a participating vehicle that has WWAN capabilities can transmit data received in the ad-hoc mode from other participating vehicles directly to the central server. From the central server, the data can be transmitted to egress points and participating vehicles.

Figure 19:
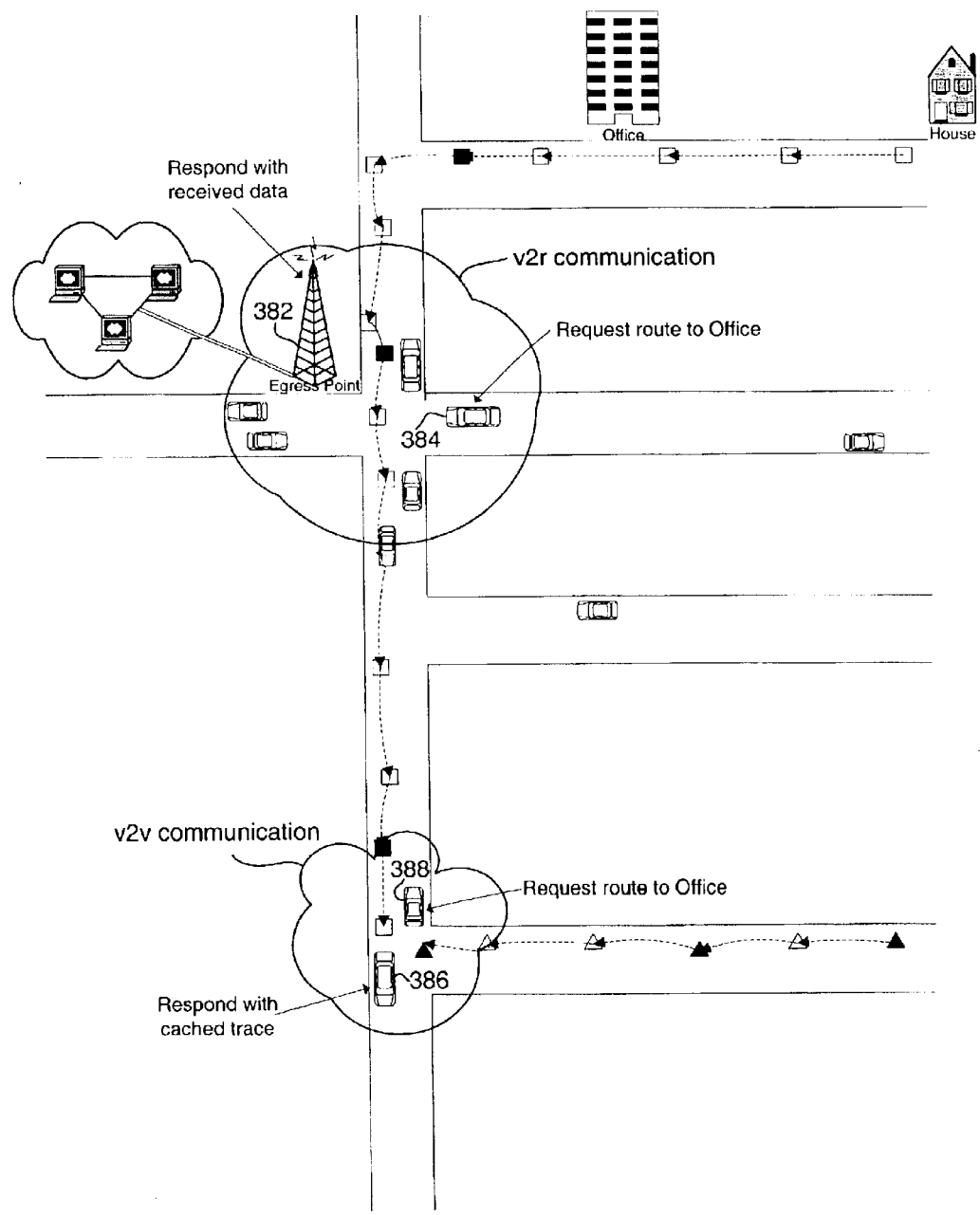
FIG. 19 illustrates two participating vehicles sharing route information.

FIG. 19 illustrates two participating vehicles sharing route information. A participating vehicle 384 requests routing directions. The participating vehicle 384 broadcasts a BST/VST beacon packet. The beacon packet includes a flag that signals a request for routing directions to a destination of the transmitting vehicle 384. The transmitting vehicle 384 may or may not be carrying an on-board geographic database.

When the beacon packet is received by an egress point 382, the egress point obtains routing instructions from its regional database. If there is no regional database at the egress point, as may be the case with a mobile egress point, turn-by-turn directions can be obtained from previously collected traces received by the egress point from other participating vehicles. Also, the egress point can forward the routing request to another egress point that has a regional database, or the routing request can be forwarded to the central database.

Another participating vehicle within range may also receive the beacon and respond with a packet comprising a series of routing instructions to the destination. The response packet can be constructed from a query of the local database of the participating vehicle that received the beacon, or from a destination approximation algorithm. For example, a participating vehicle 386 that originated from a location nearby the requested destination may return its complete trace in inverse order as a routing aid to a requesting vehicle 388. This may be useful in obtaining at least partial instructions until another participating vehicle can provide further assistance.

If a participating vehicle requesting or receiving a request for directions has only a street name in its database but no data to produce turn-by-turn directions, the vehicle derives the coordinates of the destination using an on-board reverse-geocoding application process. Using those coordinates, a surrounding minimum bounding rectangle serves as the designated destination. If another participating vehicle within range has any kind of overlap routing information within the designated destination, then a packet comprising the routing information is transmitted back to the requesting vehicle to facilitate routing decisions. The amount of overlap, or the distance between the destination and the closest geographic location from the received routing information, is compared against a threshold to determine its relevance.

Databases and Updates

Referring back to FIG. 15, when a packet is received a transition from either the on state 248 or the off sate 250 to the rx_packet state 256 occurs. In the rx_packet state 256, the packet contents, such as BST and VST data, are extracted, processed, analyzed and stored. After the received packet has been determined that it comprises new data a self-interrupt causes a transition from the rx_state 256 to the sensor state 246 for further processing as shown by the "NEW$_{13}$SAMPLE" transition arrow.

If the further processing produces statistical confidence that the local database needs to be updated, then a transition occurs from the sensor state 246 to the database state 242 as shown by the "UPDATE_DATABASE" transition arrow. The database state 242 comprises a hash table with data available from U.S. Census sources, along with a query-response interface for input/output. Alternatively, the database state 242 comprises direct system calls to commercially available geographic databases. The data available in the database state 242 can be accessed by all other states in the application.

The egress point software of FIG. 6 and the on-board software of FIG. 8 include a geographic database 96, 124 respectively. Geographic databases have many different formats. In participating vehicles, the geographic database is referred to as a local database. The local database comprises a compressed, limited data set that covers particular areas of interest or travel. In the egress points, the geographic database is referred to as a regional database, or an egress point database. The egress point database comprises a data set of the region covered by the egress point. The egress point database may also comprise data on additional regions outside the range of the egress point if the egress point equipment has sufficient memory and storage. The central server comprises the central database, which comprises data of all regions.

Figure 16:
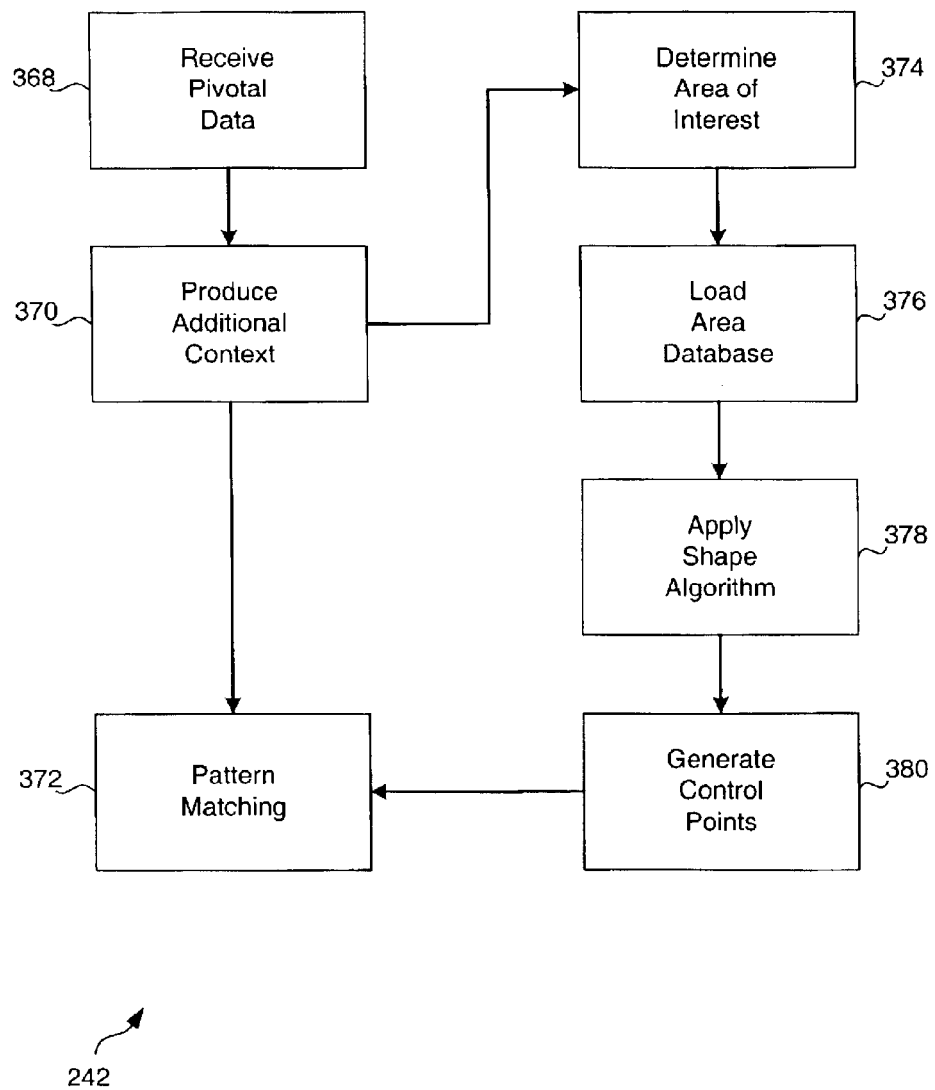
FIG. 16 shows a method for updating a database.

FIG. 16 shows a method for updating a database implemented by the database state 242. The area of interest on which the database update is going to occur is defined 374 using a bounding rectangle to define an area database. The area database is loaded into memory 376. A database in a participating vehicle does not necessary have all the cartographic details due to the different approach described previously in organizing content based on the needs of the individual end user and not the geographic region. In such a case, the participating vehicle attempts to pass the information up to an egress point or a mobile egress point. An egress point also operates on a database using dynamic content from the hierarchical floating car data network. At the same time more details can be retrieved and integrated as need arises. For example, an egress point may load into memory more data describing a road segment that was not received from participating vehicles. In this way, the egress point is able to expand the detail of the database and simultaneously assess if the new received data results a database update or some other event. In some cases, the egress point may not be able to assess if an update is needed, or the egress point might not be able to locally retrieve information that can be associated with the received report from a participating vehicle. In such a case, the egress point contacts the central server where a database with all details is maintained along with a database comprising content from only the network.

Referring back to FIG. 16, a shape algorithm is applied 378 to generate the geometric representation of present map features such as lines, polylines, curves, rectangles, polygons and the like. Next, control points are derived 389 that are used to represent complex features generated from the shape algorithm 378. Pivotal data is continuously loaded 368 from the on-board sensor modules and additional context 370 is derived. As described previously, additional context is generated to classify content based on the end user's preferences and behavior. If additional context is available, it is used to determine the area of interest 374 based not only on the current location of the participating vehicle but also on the features that are most likely to be used from the end user driving the vehicle.

Using the additional context to define the area of interest and classify the collected sensor data, a pattern matching algorithm 372 is used to compare, validate, and integrate the information available. Many pattern matching algorithms may be used. Some examples include maximum likelihood estimation, Bayesian estimation, discriminant functions, neural networks and machine learning.

Upon completion of the database update, the state machine returns to the sensor state 246 and then back to the state that caused the transition to the sensor state 246.

In most geographic databases, roads are classified based on the amount of detail they provide. For example, in one database, four levels of detail are used. At level 1, major interstate freeways are included. At level 2, interstates, highways, and expressways are included. At level 3, interstates, highways, expressways, and main residential streets are included. At level 4, all available roads are included. Turn-by-turn routing algorithms use the layered structure of the database road representation to expedite the process of discovering the route to the destination. A common approach includes, after setting the origin and destination points, applying routing at the highest level for areas nearby the origin-destination points, and for the remaining uncovered areas, applying routing search algorithms using road detail information available at level 2.

Figure 14:
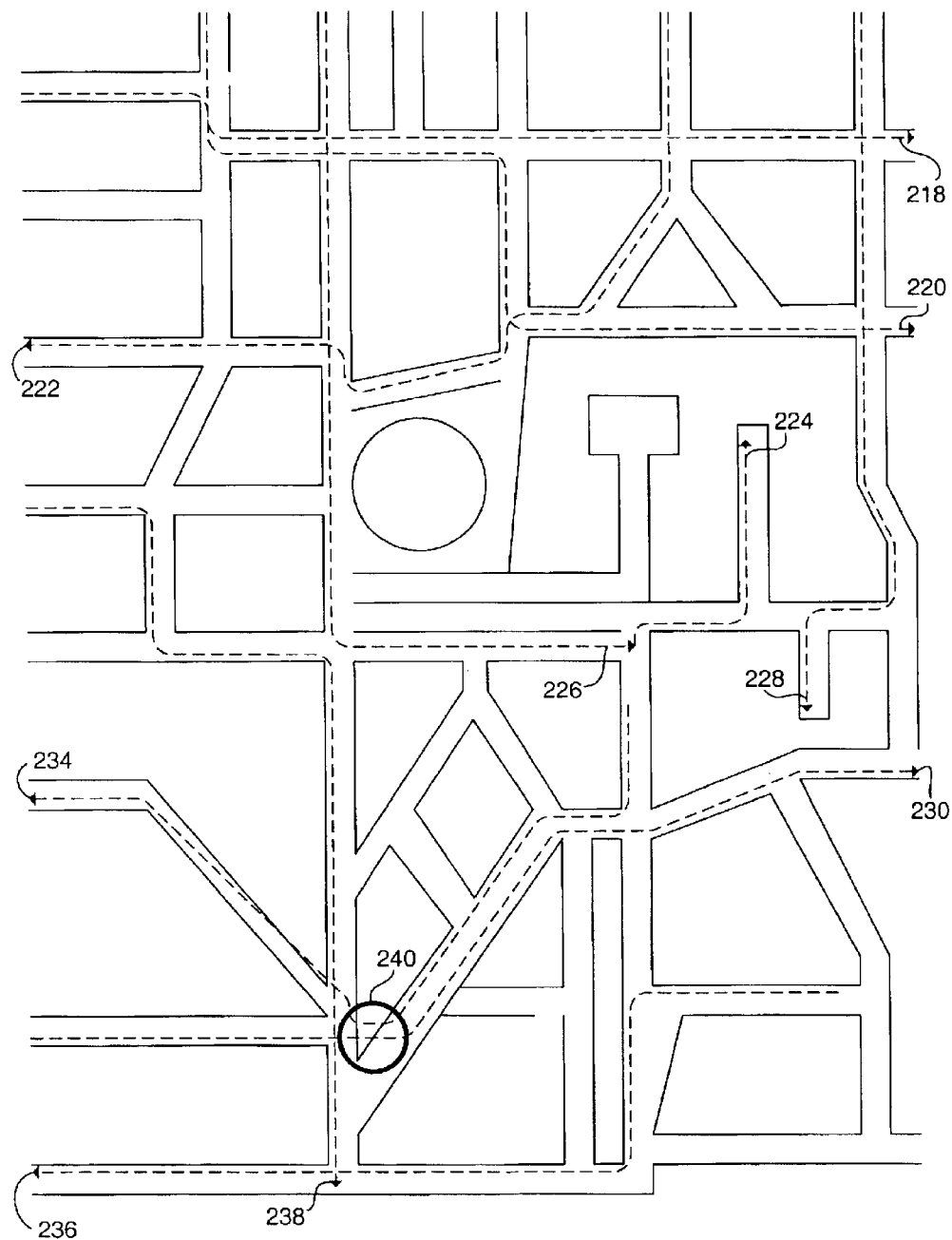
FIG. 14 shows traces from a plurality of participating vehicles traveling a network of roads.

FIG. 14 shows traces from a plurality of participating vehicles traveling a network of roads. Most of (he vehicle traces 218, 220, 222, 226, 228, 230, 234, 236, and 238 correspond to road information of the database. However, the portion of traces indicated by region 240 does not correspond with the roads of the database. In this exemplary case, a piecewise Rubber-Sheet transformation and ward point triangulation comparisons can be performed to adjust the database. These calculations can be performed on the local database of a participating vehicle, at a database at an egress point, or at the database at the central server.

Sometimes traces from participating vehicles may correspond to off-road routes and not a new road or an additional lane. For example, a driver may drive through a gas station to avoid a traffic light at an intersection. That route should not be considered as an indication that the intersection has changed. In another example, the trace of a vehicle using a bike lane or the emergency lane should not be considered as an indication of a new available lane. Also, overlapping areas such as bridges, overpasses, and tunnels should not be considered intersections. Trend analysis of the samples is used to avoid situations such as these. Trend analysis is based on linear regression equations. Many other techniques may be used.

Errors can also be produced when calculating average flow speed for road segments comprising both carpool lanes and regular lanes. On many large roads a carpool lane, or high occupancy vehicle (HOV) lane, is reserved for use by vehicle carrying more than one passenger. When the speed of the vehicle is recorded, as discussed above, some vehicles will appear to be moving much faster than other vehicles, producing an artificially high average flow speed. If the sample is large enough the error can be reduced since a much larger proportion of vehicles travel on non-HOV lanes over during a period of time. For example, if 75% of participating vehicles are not in the HOV lane then using the median of all readings for a road segment leads to a number much closer to the realistic flow speed. Alternatively, using the relative location of participating vehicle along with speed can also provide accurate results. For example, a participating vehicle with a trace that appears on average to be on the 10% of the leftmost traces previously accumulated for a road segment is very likely to be using an HOV lane. This is further the case if the vehicle is moving at a much higher average flow speed than vehicles with traces on the rest of the road segment.

One common, and standard, interchange format for geographic databases is the Geographic Data File (GDF) format. GDF is used by the International Standards Organization (ISO) and Committee European pour Normalizalion (CEN). Another common interchange format is the Spatial Data Transfer Standard (SDTS). Another format called openGIS from the Open GIS Consortium can be used to represent GIS data from various database providers. Many methods and systems may be used to form the geographic databases from sensor data from the participating vehicles as they travel the transportation network such as the method and system of U.S. Pat. No. 5,953,722, which is hereby incorporated by reference.

The structure of the geographic database supports methods to search and identify objects of interest. An object of interest comprises unique database semantic identifiers and enhanced characteristics to facilitate interpretation of database entries. In the GDF model a node, edge, point, line, area, federal information processing standards (FIPS), relationship, source document, and a name are objects of interest. A set of nodes or edges, X/Y/Z values, attributes, text of a name, geometric composition, and any descriptive information are characteristics. A sub-attribute may be used with a characteristic to define a limitation for an object. When a characteristic is associated with an object it is given a value.

A database object can be identified by either an explicit reference when a unique identifier is available, or by a descriptive reference when a portion of the characteristic data forms the database query. The database publisher is responsible for defining the reference applicable to a database object, the format of the references, and the fields that comprise a reference.

There are two kinds of updates that can take place in a database: an incremental update, and an insert or delete update. An incremental update is for updating old data with current data. An insert or delete update is for inserting new information or deleting old information. For example, a change in the allowable traffic direction is an incremental update, whereas a new street entity (name and direction) is an insertion update. All updates are accompanied by control metadata that ensures the integrity of the database before and after the update. As an update is processed, the database transitions between valid states and always maintains a valid fallback state in case of database instabilities.

An update identifier is a number that uniquely identifies the updating process. Since many participating vehicles and egress points can generate database updates, an update identifier comprises two fields: a unique participating vehicle or egress point identifier, and a wrap-around sequentially increasing integer which is based on the number of updates produced from the same source. The update identifier also comprises a dependency field, a database identification fields, a timestamp, and a number of actions field. The dependency field is a set of update identifiers that must be successfully completed prior to the current update. The database identification field is the identifier of the database being updated. The timestamp is the time period during which the update information became available. The number of actions field is the number of updates requested from the source of the additional information, that is the participating vehicle or egress point.

The update identifier also comprises the database actions. The database actions comprise a detailed description of the nature of the update to be performed. The types of actions are: add and object, delete and object, add a characteristic, delete a characteristic, and modify a characteristic. An action comprises the fields: a credibility factor that comprises the statistical sample collected before the update was generated, an object reference that provides a pointer to an object, an old data state and a new data state comprising the old and new contents of the object. The contents of the old data state and the new data state change according to the type of the action that is required.

An action is performed if the statistical sample described by the credibility control field exceeds a threshold. If there is no strong statistical evidence to apply an update, the action is discarded. Calibration using past results can take place to adjust the credibility factor if it appears to be too high to too low.

The geographic database and the updates can be represented in different formats. In that case, a wrapper may be used to translate a proprietary database format to a non-proprietary database format, incorporate the new updates, and then translate the resultant database to its original proprietary format. A metadata table can be used to translate data from a future version database to a database in use by a participating vehicle. If a metadata table cannot provide the necessary version translation, replacement routines are used. A replacement routine replaces native code from the interface layer, or a navigation application. To speed up execution of the replacement routine they may be compiled to an interpreted, machine independent format. Portions of the metadata engine may be written in a Java virtual machine (JVM) environment. If memory is limited, replacement functions may be loaded into memory during initialization or during run-time as needed.

To ensure stability and continuous operation of the database of the central server, a duplicate copy of the database is maintained. A participating vehicle or egress point uploads information to the central server. A database modification process similar to that described above compares the new information with the current database contents and creates a transaction data file that contains all necessary actions that need to be executed. Each transaction identifies the data entity affected and the kind of modification to be made to it. A unique transaction ID is assigned to each transaction in the data file. The resultant file comprises a series of modifications to be made to the second database. Once the second database has been successfully updated, the original copy of the central database is checked out to apply the modifications stored in the transaction file.

Through the hierarchical floating car data network, database updating is redefined through a layered, data-centric architecture. Egress points, for example, comprise a portion of the central database that covers their geographic vicinity. Egress points upload their modified regional databases, along with their accumulated data, to the central server. Using a unique egress point region identifier, the central server directly integrates the regional database.

When exchanging databases or routing traces, compression methods utilizing data represented as deltas can be used, such as in U.S. Pat. No. 6,460,046, which is hereby incorporated by reference. Curve fitting methods, linear approximation, and other methods can also be used. Huffman coding may be used, where Huffman trees can be created that correspond to different information layers of the database, such as in U.S. Pat. No. 6,393,149 which is hereby incorporated by reference. If processing requirement for compression and decompression are high, thereby causing processing bottlenecks, less efficient compression techniques may be used. Scaling methods may be used to select sample points along new or modified trajectories in much the same way a variable segment length describes a complex line.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. An infrastructure mode packet transmitting method for a participating vehicle in a hierarchical floating car data network, comprising the steps of:
   (a) determining if a beacon timer has expired;
   (b) if the beacon timer has expired, creating a beacon service table packet or vehicle service table packet;
   (c) determining whether a memory threshold is exceeded;
   (d) if the memory threshold is exceeded, creating a packet burst;
   (e) sending the packet and/or the packet burst to a radio;
   (f) queuing the packet and/or the packet burst sent in (e);
   (g) transmitting the packet and/or the packet burst; and
   (h) transitioning to a receive mode.

2. An infrastructure mode packet receiving method for an egress point in a hierarchical floating car data network, comprising the steps of:
   (a) receiving a packet, wherein the packet comprises a beacon service table, a vehicle service table packet, or a packet burst;
   (b) sending the packet to an application;
   (c) determining whether a memory threshold is exceeded;
   (d) if the memory threshold is exceeded, rejecting the packet and transitioning to a transmit mode; and
   (e) if the memory threshold is not exceeded, accepting the packet and transitioning to a receive mode.

3. An infrastructure mode packet receiving method for a participating vehicle in a hierarchical floating car data network, comprising the steps of:
   (a) receiving a packet, wherein the packet comprises a beacon service table, a vehicle service table packet, a packet burst, or a negative acknowledgement packet;
   (b) sending the packet to an application;
   (c) processing the sent packet;
   (d) determining whether the packet should be retransmitted;
   (e) if the packet should be retransmitted, transitioning to a transmit mode; and
   (f) if the packet should not be retransmitted, transitioning to a receive mode.

4. The invention infrastructure mode packet receiving method of claim 3, further comprising the steps of:
   (g) determining whether a communication link used for the receiving in (a) is lost;
   (h) if the communication link is lost, determining if the negative acknowledgement packet was received in (a);
   (i) if the negative acknowledgement packet was received, transitioning to the receive mode; and
   (j) if the negative acknowledgement packet was not received, flagging previously transmitted packets and transitioning to the receive mode.

5. An infrastructure mode packet transmitting method for an egress point in a hierarchical floating car data network, comprising the steps of:
   (a) determining whether an enhanced beacon timer has expired;
   (b) if the enhanced beacon timer has expired, creating an enhanced beacon packet;
   (c) if a received packet burst is rejected, creating a negative acknowledgement packet;
   (d) sending the enhanced beacon packet and/or the negative acknowledgement packet to a radio;
   (e) queuing the sent packet;
   (f) transmitting the queued packet; and
   (g) transitioning to a receive mode.

6. An ad-hoc mode packet transmitting method for a participating vehicle in a hierarchical floating car data network, comprising the steps of:
   (a) if a beacon timer is expired, creating a beacon service table packet or a vehicle service table packet;
   (b) if a memory threshold is exceeded, creating a packet burst;
   (c) if a positive acknowledgement is required, creating a positive acknowledgement packet;
   (d) sending the beacon service table packet, the vehicle service table packet, the packet burst, and/or the positive acknowledgement packet to a radio;
   (e) queuing the packet;
   (f) transmitting the packet; and
   (g) transitioning to a receive mode.

7. An ad-hoc mode packet receiving method for a participating vehicle in a hierarchical floating car data network, comprising the steps of:
   (a) receiving a packet wherein the packet comprises a beacon service table, a vehicle service table packet, or a packet burst;
   (b) sending the packet to an application;
   (c) processing the packet sent
   (d) determining whether the packet should be rejected or accepted, or whether the packet is a positive acknowledgment packet;
   (e) if the packet is rejected, transitioning to a receive mode;
   (f) if the packet is accepted, setting a timer and transitioning to the receive mode;
   (g) if the packet is a positive acknowledgement packet, resetting the timer and transitioning to the receive mode; and
   (h) if the timer expires before the packet is received in (a), creating a positive acknowledgement signal and transitioning to a transmit mode.

* * * * *